US010894514B2

(12) United States Patent
Williams

(10) Patent No.: US 10,894,514 B2
(45) Date of Patent: Jan. 19, 2021

(54) WHEEL MOUNTED CARGO CARRIER

(71) Applicant: Marty Williams, Colorado Springs, CO (US)

(72) Inventor: Marty Williams, Colorado Springs, CO (US)

(*) Notice: Subject to any disclaimer, the term of this patent is extended or adjusted under 35 U.S.C. 154(b) by 0 days.

(21) Appl. No.: 16/833,248

(22) Filed: Mar. 27, 2020

(65) Prior Publication Data

US 2020/0307465 A1   Oct. 1, 2020

Related U.S. Application Data

(60) Provisional application No. 62/824,793, filed on Mar. 27, 2019.

(51) Int. Cl.
*B60R 9/10* (2006.01)
*B60R 9/06* (2006.01)
*B60R 11/00* (2006.01)

(52) U.S. Cl.
CPC .............. *B60R 9/10* (2013.01); *B60R 9/06* (2013.01); *B60R 2011/004* (2013.01); *B60R 2011/0059* (2013.01); *B60R 2011/0071* (2013.01)

(58) Field of Classification Search
CPC ..... B60R 9/10; B60R 9/06; B60R 2011/0071; B60R 2011/0059; B60R 2011/004; Y10S 224/924; B62D 43/02
USPC ...................................... 224/42.13, 511, 924
See application file for complete search history.

(56) References Cited

U.S. PATENT DOCUMENTS

| | | | | |
|---|---|---|---|---|
| 3,972,457 A * | 8/1976 | Kesler | ...................... | B60R 9/12 224/511 |
| 4,132,336 A * | 1/1979 | Leinaar | .................. | B62D 43/02 211/23 |
| 5,007,567 A * | 4/1991 | Foster | ...................... | B60R 9/10 224/42.13 |
| 5,085,360 A * | 2/1992 | Fortune | .................... | B60R 9/10 224/42.13 |
| 5,215,232 A * | 6/1993 | Wyers | ...................... | B60R 9/06 224/42.13 |
| 5,558,261 A * | 9/1996 | Hedeen | ..................... | B60R 9/10 224/42.13 |
| 5,702,040 A * | 12/1997 | Hedeen | ..................... | B60R 9/10 224/314 |
| 5,836,492 A * | 11/1998 | Allen | ....................... | B60R 9/06 224/493 |
| 7,331,494 B2 * | 2/2008 | Huang | ...................... | B60R 9/06 224/42.13 |

* cited by examiner

*Primary Examiner* — Corey N Skurdal
(74) *Attorney, Agent, or Firm* — Tracy M. Heims; Apex Juris, pllc.

(57) ABSTRACT

The present invention is a cargo carrier 100 for attachment to a mounted tire having a continuous curved bridge where the bridge has a first end 110 followed by a first concave section 182, a convex middle section 180 and a second concave section 185 followed by a second end 130; there is an arm member 140 extending upwardly from each of the first 110 and second ends 130 with at least one payload carrying member 200 connectable to the arm members 140 to secure a payload to the cargo carrier 100; there is at least one tire mount 300 at a curved bridge bottom 188 that rests on an upper surface of the tire and at least one securement apparatus 310 to secure the cargo carrier 100 to the tire.

18 Claims, 27 Drawing Sheets

WHEEL MOUNTED CARGO CARRIER

CROSS-REFERENCE TO RELATED APPLICATIONS

This application claims priority to previously filed U.S. Provisional Patent Application No. 62/824,793 filed on 2019 Mar. 27.

BACKGROUND OF THE INVENTION

Field of the Invention

The present invention addresses new methods of mounting a cargo carrier on top of a wheel, such as a wheel found on the rear of a vehicle, trailer or motor home.

Description of the Prior Art

There exist numerous hitch, roof, bumper and trunk mounts for carrying bicycles, skis, snowboards, jacks, lights and other cargo for transportation of such items on top or on the rear of a vehicle or trailer. Conventional carriers have mounts dedicated to a particular item, such as, for example, a bicycle, trailer jack or cargo carrier. Hitch-mounted carriers are popular with SUVs and other vehicles that have hitch or tow tower attachments. A bracket or hitch mounted tube on which such conventional carrier systems are permanently or semi-permanently mounted typically include securing mechanisms corresponding to a particular piece of equipment, case, or article, and lack adaptability to other types of surfaces or cargo.

That is, dedicated carriers have distinct mounting mechanisms and carrier frames adapted for fastening and transporting particular equipment, gear or other cargo type. For example, bicycles, trailer jacks, steps, water or snow skis, snowboards, as well as, surfboards and wakeboards require dedicated mounting mechanisms having distinct receiver tubes and brackets.

In addition, conventional carrier systems typically are limited to mounting systems for a single hitch receiver, and the use thereof is preempted when a trailer or other accessory is mounted to the hitch. Moreover, such prior art systems typically are rigidly aligned to accommodate specific equipment or cargo configurations and therefore are limited to a dedicated single use.

With regard to bicycle carriers, even different bicycle species, such as unicycles, road bicycles, cross-trainer bicycles, gravel bicycles and mountain bicycles may require distinct carriers due to varying frame configurations and designs. For example, conventional hitch mounted carriers typically have welded crossbars with horizontally extending arms positioned to accommodate the frames and handlebars of particular bicycles with respect to their sizes. Such bicycle carrier frames typically are not adaptable to different bicycle or other cycle styles and are basically prevented from carrying alternative cargo or equipment. In addition, conventional carriers are heavy and awkward to align and mount onto the vehicle.

For example, hitch mounted carriers typically have a square bar or tube that is fitted to slide into a receiver mounted on the vehicle. A pin engages the bar or tube in the receiver to secure the carrier to the vehicle and a mounting bar is permanently mounted onto the tube with horizontally extending arms onto which a bicycle is secured. These prior art carriers are heavy and are awkward to align and mount onto the vehicle. Additionally, many rear spare tires prevent the use of a hitch rack due to the close clearance of the hitch and tire bottom.

Also, the receivers and mounting mechanisms of conventional cargo carriers typically are not adaptable to alternative carrier configurations and applications. Thus, different mounting mechanisms and hardware are required for different carriers and to fasten varying cargo types. A further disadvantage of such dedicated systems is their incapacity for accommodating bulky configurations in the limited space behind a vehicle when a trailer is hitched to a vehicle to mount an accessory when a towing a trailer.

A particular problem with hitch mounted carriers is the use of the vehicle hitch receiver. Since conventional hitch mounted carriers are mounted to the hitch receiver, the vehicle may not be used for another use requiring the hitch receiver because the hitch receiver is already in use. Often it is necessary to use the hitch receiver for other purposes, such as towing a trailer. In that event, such a conventional hitch-mounted carrier cannot be mounted. U.S. patent application Ser. No. 11/697,294 addresses such and other problems relating to hitch-mounted carriers by providing a system with adjustment mechanisms for mounting a bicycle carrier on a shank above a hitch receiver whereby a trailer or other accessory may be connected to the hitch receiver. It further enables cargo to be mounted above and clear of the heat emanating from the exhaust tailpipe of different vehicles.

However, in view of the increasing demand for a burgeoning array of recreational equipment, as well as, other tools, supplies and other cargo consumers wish to transport to their travel destination, a need nonetheless persists for additional mounting mechanisms and systems for expanded cargo demands. In particular, there is a need for an adaptive mounting and fastening system to utilize the available space behind and above the vehicle when a trailer is hitched to the vehicle. That being, particularly, on top of the spare tire when available.

Many drawbacks result from such lack of versatility and portability, including limited or singular application cargo mounting mechanisms including receivers, brackets and fasteners, of prior art cargo carriers. As detailed herein, differing mounting mechanisms, such as receivers and brackets, of equipment and carrier cases have, in the past, required separate and distinct carrier systems. Moreover, these mounting devices are limited to specifically corresponding surfaces, hitch or other receiver tubes, and lack a bumper mount option. Such conventional carrier mounts thus lack adaptability and portability. Due to such and other drawbacks, conventional carriers require multiple and distinct mounts and brackets with limited or a single application suited to particular surfaces, rails or bars, depending on the size and shape of the equipment or other cargo.

In sum, there exists nothing in the prior art that provides a versatile, readily adjustable carrier adaptable for mounting on vehicles while a trailer hitch is in use for another mechanism and adaptable for mounting equipment or other cargo in a manner optimizing the use of space above a spare tire or about a trailer hitched to a vehicle. There is also a lack of mounting mechanisms adaptable to various types, sizes and shapes of cargo, such as, for example, recreational or cargo between locations. Nor is there a simple system that utilizes a spare tire as the mount for a cargo carrier where the carrier is above the tire. Thus, there persists a need for a cargo carrier system which overcomes such and other limitations, problems and drawbacks.

It should be appreciated that all combinations of the concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

SUMMARY OF THE INVENTION

The present invention solves the above referenced problems and other problems by providing a versatile and portable receiver extending into two outwardly extending angled mounting members for receiving arm members or wings, wherein a bridge and the extended angled mounting members generally configure the shape of an inverted U with a return at each end. Accordingly, as used herein, the bridge and the two outwardly extending members shall be referred to as the bridge and arms. In preferred embodiments of the present invention, the arm members received in the receiver preferably comprise square tubes oriented to angle outwardly and upwardly to an extent equipment or cargo is well supported.

As further described in the detailed description of preferred embodiments below, particularly preferred embodiments feature a radially formed bridge that is sized to correspond to various tire sizes, wherein the bridge tube corresponds to various tire sizes conventionally installed on the rear door of recreational vehicles, such as off-road vehicles, for example Jeep, or Sport Utility Vehicles, or trailers and the rear of passenger vehicles as spare tires.

Preferred embodiments of the present invention further teach a tire mount wherein an arm receiver is integrally formed or permanently affixed on a plate with perpendicularly oriented flanges spaced apart a distance corresponding to the tire diameter and providing a bracketed housing for the receiver hereinafter referred to as a "tire mount." The tire mount may be secured with a strap, plate, or common bolt to the spare tire carrier plate or clamp fitted for braced and seated engagement with a tire and can be configured to fit alternative tire sizes.

The present invention further includes rectangular frame bases providing integral attachment points for the arms and is adapted for carrying suitable cargo or equipment while simultaneously orienting the receiver to access spaces with adequate area for carrying bikes and other cargo. Such pockets or tubing ends may be vertically aligned and particularly adapted to standard spare tire diameters above which arms received in the receiver are elevated to access the area above the spare tire. Alternatively, a horizontally aligned rectangular pocket may be adapted to a corresponding cargo carrier whereon vertically aligned receivers and mounting mechanisms provide for fastening suitably configured items to arms inserted and secured thereto. The following drawings and detailed description of preferred embodiments clarify details and applications of the present invention. Hence, these and other features of the present invention will be evident from the ensuing description of preferred embodiments along with the drawings.

DETAILED DESCRIPTION OF PREFERRED EMBODIMENTS

Figure 1:
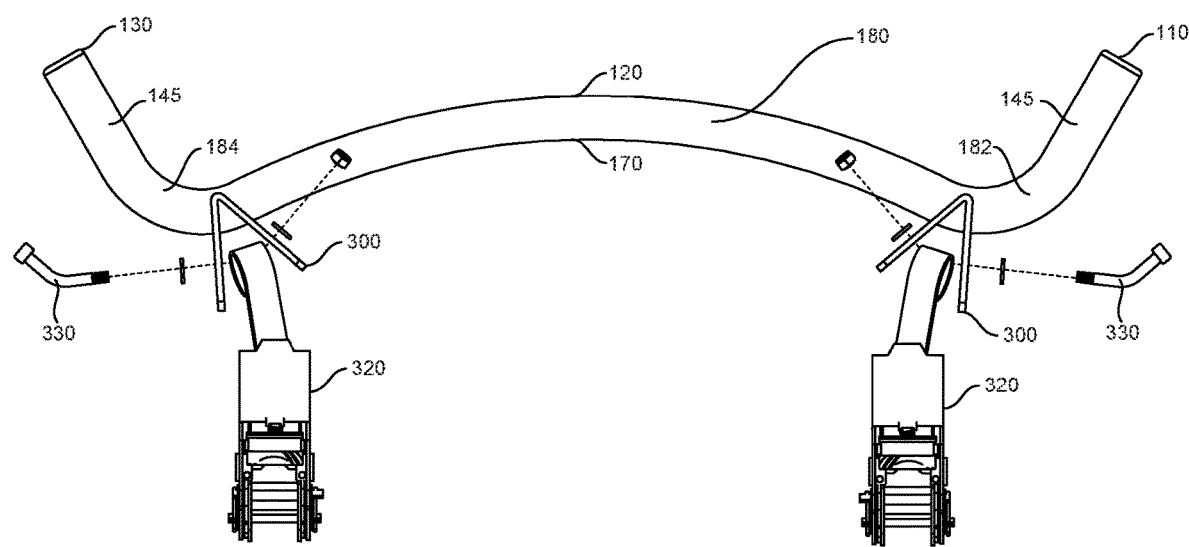
FIG. 1 is a frontal view of the cargo carrier.
Figure 3:
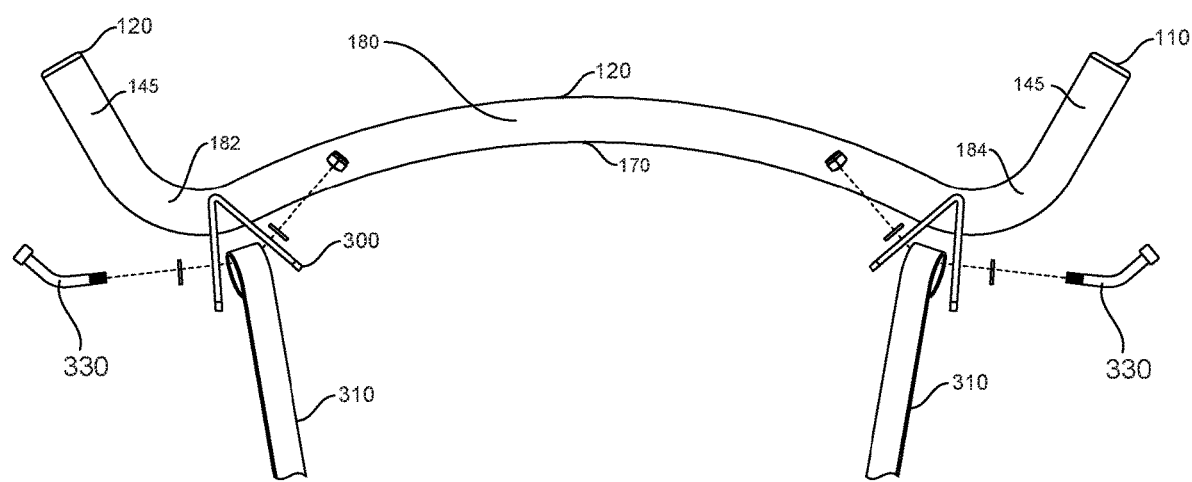
FIG. 3 is a frontal view of the cargo carrier prior to strap connection.
Figure 26:
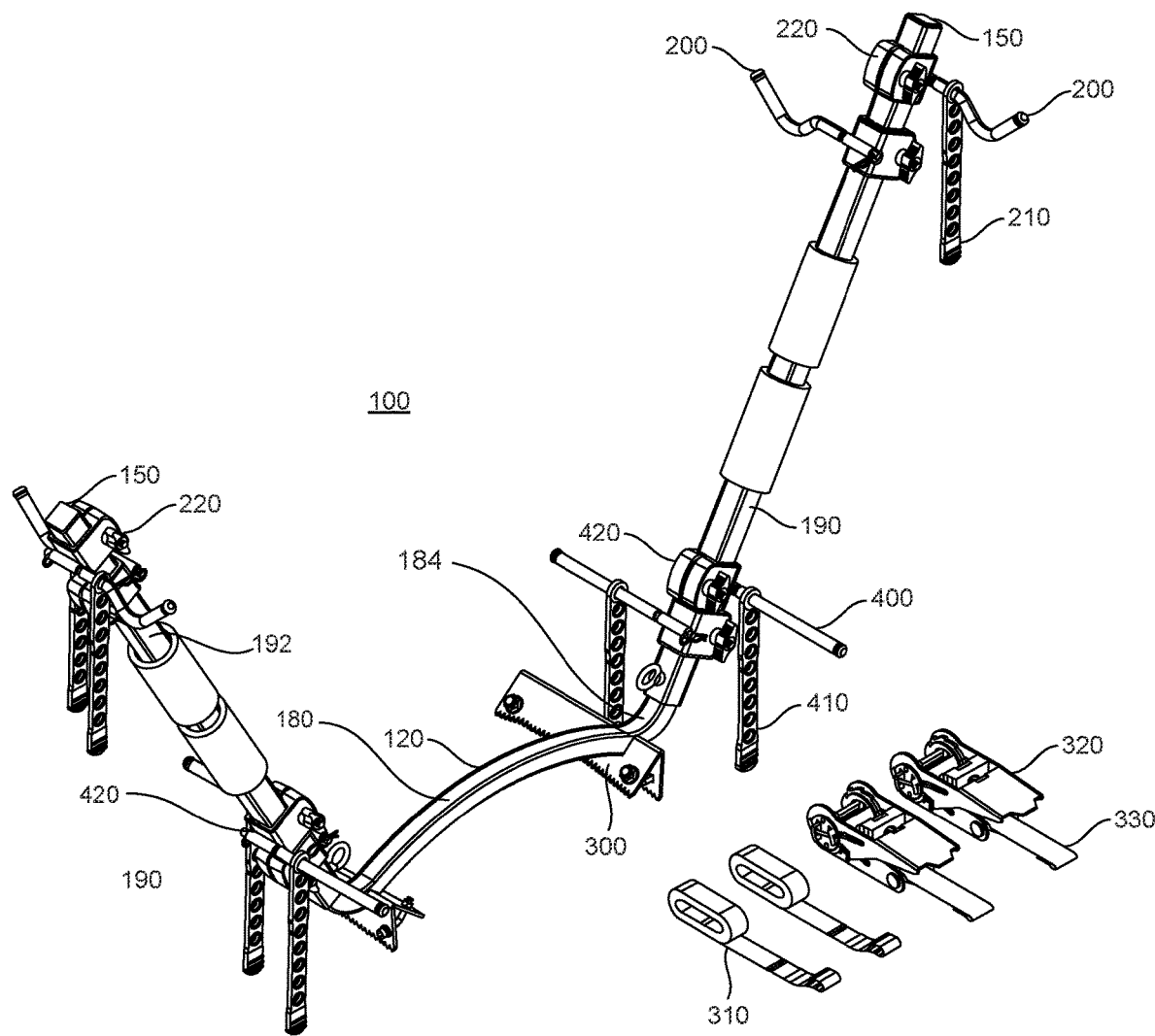
FIG. 26 is a perspective view of the cargo carrier.
Figure 27:
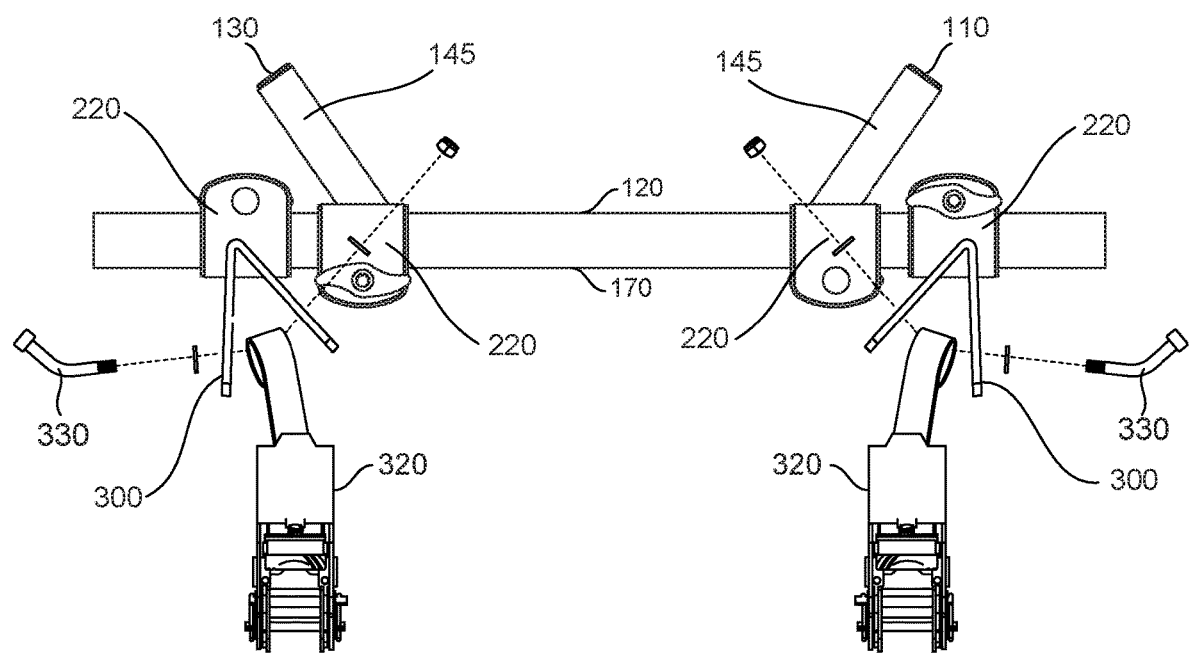
FIG. 27 is a front view of the cargo carrier with a straight bridge.

The present invention relates to a cargo carrier 100 for attachment to a vertically mounted tire where the cargo carrier 100 has a bridge where the bridge has a first end 110, a middle section 120 and a second end 130; arm members 140, each having a first end 150 located near and extending upwardly from the bridge first end 110 and the bridge second end 130; at least one payload carrying member 200 connectable to the arm members 140 to secure a payload to the cargo carrier 100; at least one tire mount 300 at a bridge bottom 170 that rests on an upper surface of the tire; and at least one securement apparatus 310 for securing the cargo carrier to the tire. This embodiment is clearly shown in FIGS. 1, 3, 26 and specifically in FIG. 27. In FIGS. 1, 3, 26 the bridge is curved, however, it is entirely possible to have a straight bridge with no curve or arch and this first embodiment description refers to such design, as is shown in FIG. 27.

FIGS. 5-9 show the cargo carrier and how it is used with a tire. In most applications of this cargo carrier it is used with an externally mounted tire, just as that found on the rear of a Jeep. FIGS. 5-9 show the cargo carrier where the securement apparatus is connectable to the tire mount and the tire. FIGS. 1-9 show the parts used and steps taken to secure the cargo carrier to the tire. These Figs. show the cargo carrier 100 where the securement apparatus is a strap 310 and a tightening apparatus 320; whereby the tightening apparatus 320 is connected to each strap 310 to tighten the strap 310 between the tire mount 300 and the tire to securely tighten and hold the cargo carrier 100 to the tire. In a more preferred embodiment, the cargo carrier has at least two tire mounts 300, as shown in FIGS. 1, 3, 6 and 7 where the first tire mount 300 is located at the bridge first end 110 and the second tire mount 300 is located at the bridge second end 130 and where there are at least two straps 210 where a first strap 210 is connectable to the first tire mount 300 and a second strap 210 is connectable to the second tire mount 300. Looking to the Figs will help more clearly define this configuration.

FIG. 1 is a frontal view of the cargo carrier 100. In this Fig. the cargo carrier 100 is shown with the full length of the bridge shown. On the left side of the FIG. 1 is the bridge first end 110 followed by the bridge middle 120 and then the bridge second end 130. It can be seen in the Fig. that the ends turn up at the end of the bridge but the bridge could be a straight, solid member as shown in FIG. 27. Near the ends on both sides of the bridge the tire mount 300 is seen at a bottom of the bridge 170. In this embodiment there can be seen two connectors that secure the tire mounts 300 to the securement apparatus and here the securement apparatus is a strap 310. Although it is a strap in this embodiment it could be any other type of securement apparatus. Also in this FIG. 1 the strap is connected to the tire mount with a pin and a nut. However, it could be any type of mechanism as long as it can connect the strap 310 to the mount 300. Also FIG. 1 shows the tightening apparatus 320.

Figure 2:
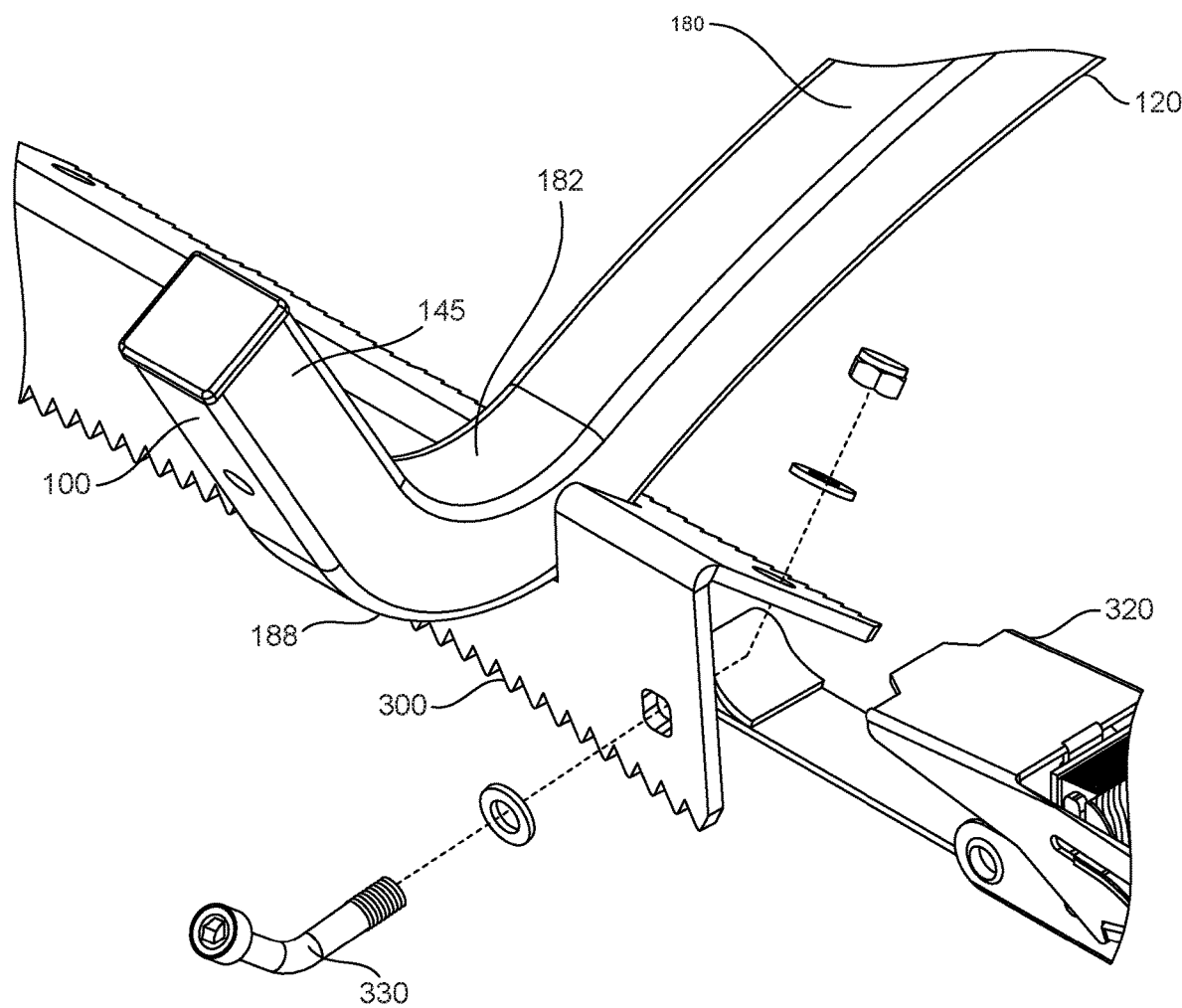
FIG. 2 is a close up view of one end of a bridge with tire mount and connector.

FIG. 2 more clearly defines how the parts are connected. FIG. 2 is a close-up view of one end of the bridge showing bridge end 110, the tire mount, the strap connector 330, the strap 310 and an end of the tightening apparatus 320. As can be seen in FIG. 2, the bottom of the tire mount has a jagged edge. This jagged edge helps prevent the cargo carrier from moving on the tire once mounted.

FIG. 3 again is a frontal view of the cargo carrier prior to strap connection.

Figure 4:
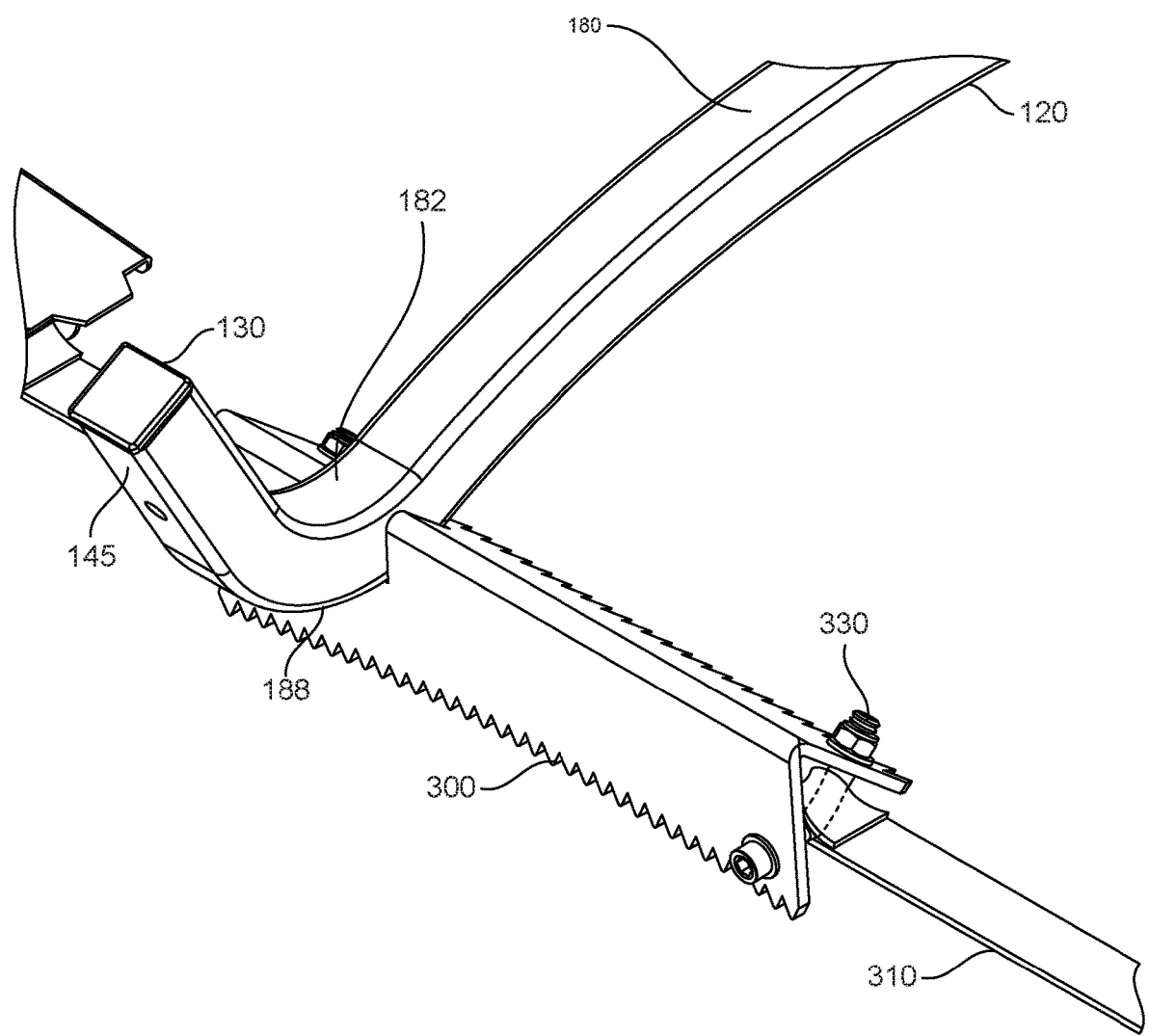
FIG. 4 is a perspective, close up view showing one end of the bridge with strap connected.

FIG. 4 is a perspective, close up view similar to FIG. 2 showing one end of the bridge with strap connected. As can be seen the strap uses strap connectors 330 that are removable so that the straps can be removed from the cargo carrier.

Figure 5:
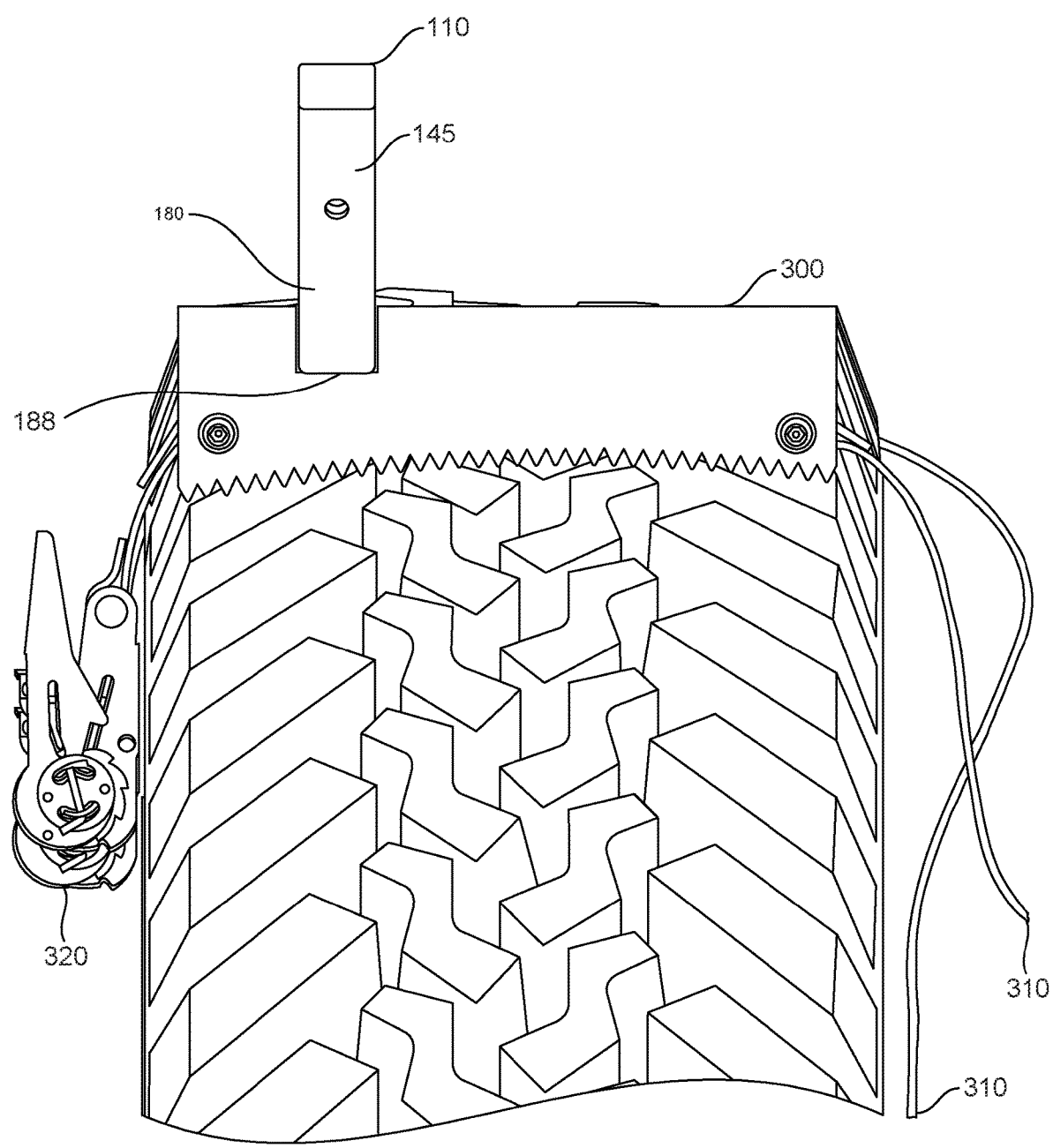
FIG. 5 is side view of the present invention showing the lower part of the cargo carrier on a tire mount having perforated slots in a lower base plate for positive engagement with the rubber of a tire to prevent motion or slippage.
Figure 6:
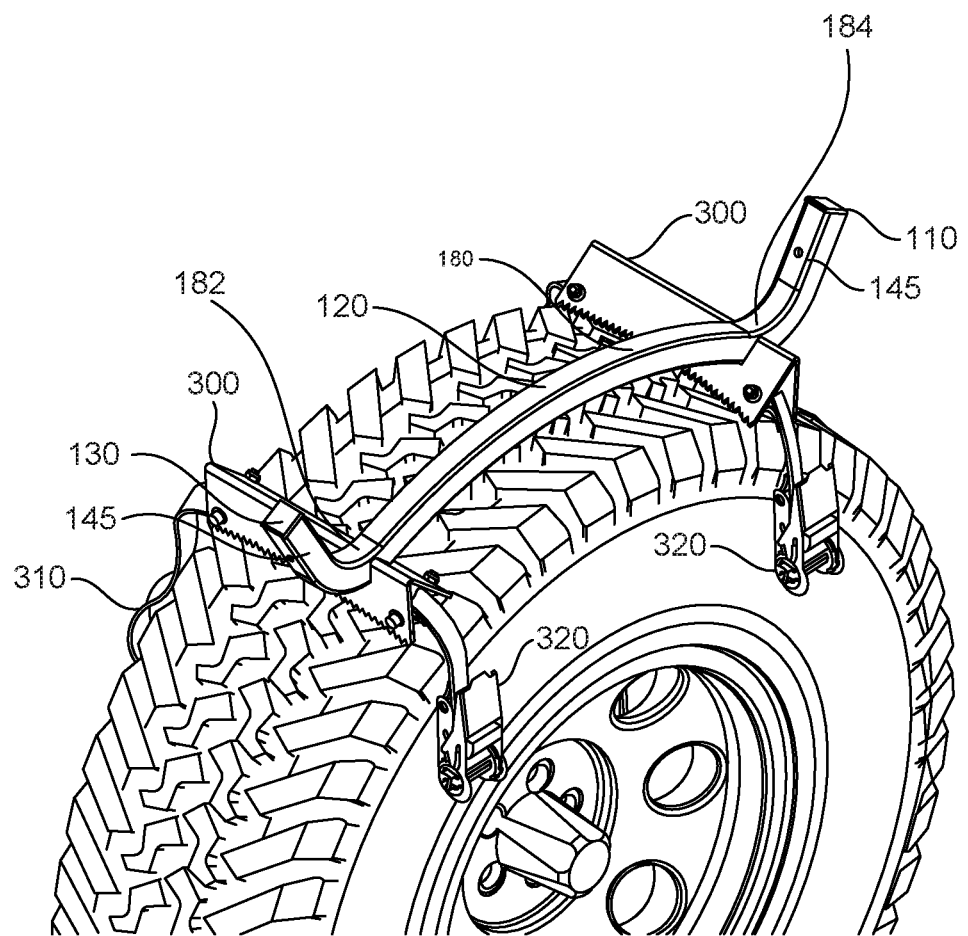
FIG. 6 is a perspective view of the cargo carrier showing the bridge, tire mounts, straps and tightening apparatus prior to securement to the tire.
Figure 7:
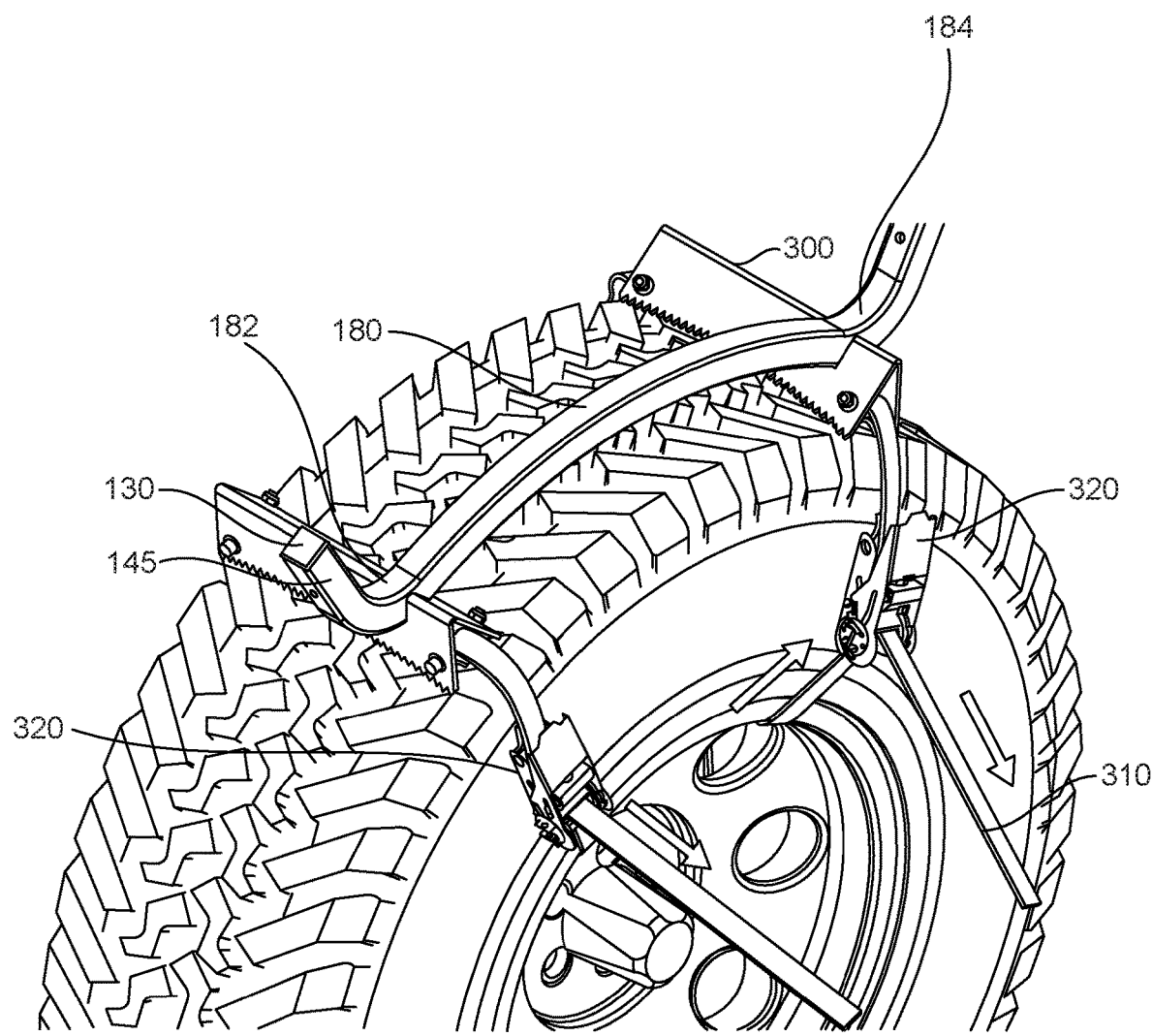
FIG. 7 is a perspective view of the cargo carrier showing the bridge, tire mounts, straps and tightening apparatus after being secured to the tire.
Figure 8:
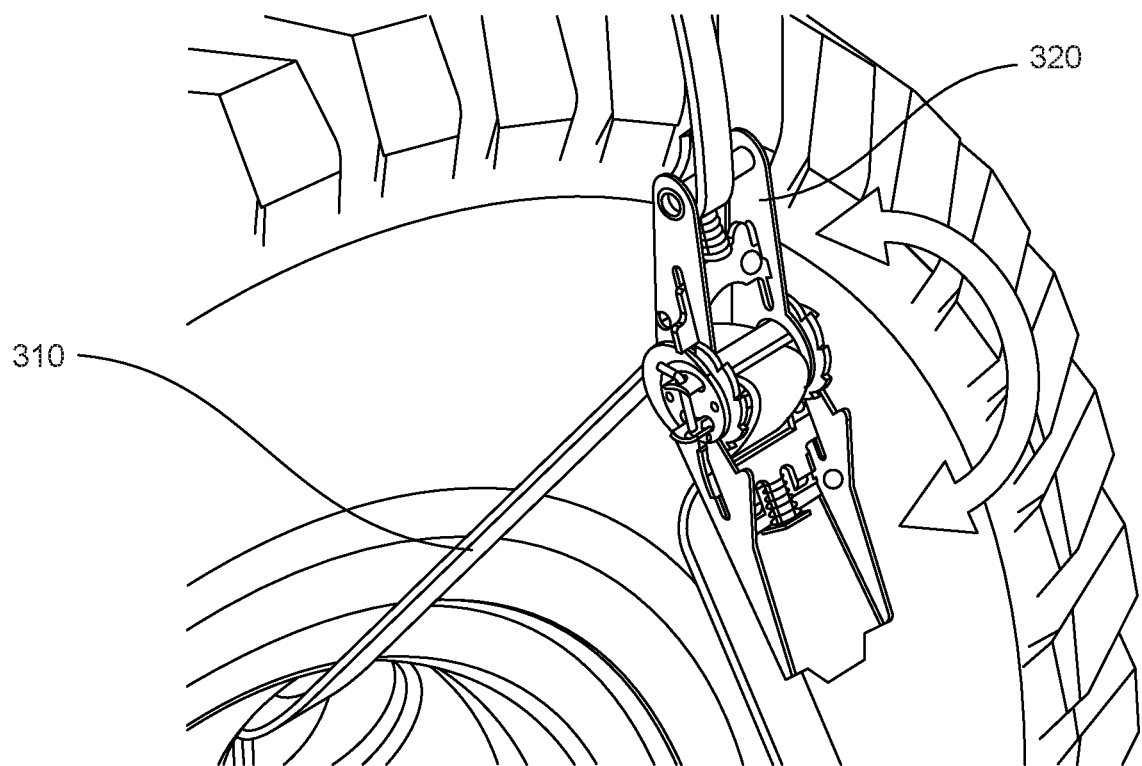
FIG. 8 is a perspective view showing the securement tightening apparatus.
Figure 9:
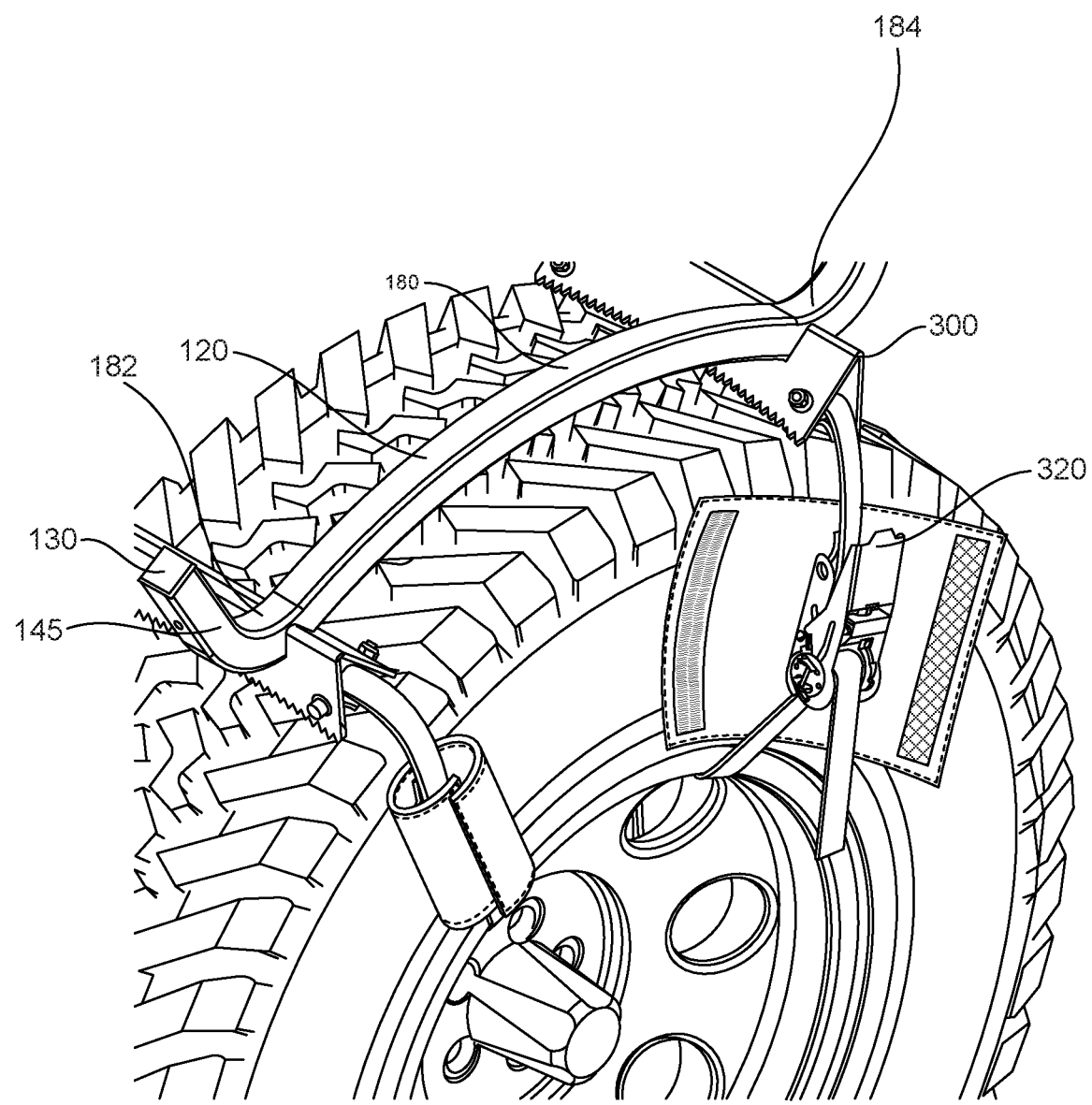
FIG. 9 is a perspective view of the cargo carrier showing the bridge, tire mounts, padding, straps and tightening apparatus after being secured to the tire.

FIG. 5 shows the cargo carrier from an entirely different perspective. This Fig. is a side view of the present invention showing the lower part of the cargo carrier connected to the tire mount where the tire mount has perforated slots in the lower base plate for positive engagement with the rubber of a tire to prevent motion or slippage. In this embodiment the cargo carrier is welded to the tire mount but it should be understood that the carrier 100 can be secured to the tire mount 300 using other connection means. FIG. 5 on the left side also shows the tightening apparatus 320. The cargo carrier 100 is connected using simply the tire mount 300, the strap 310, and the tightening apparatus 320. In practice, as shown in FIGS. 6-9, the straps are connected to the tire mount 300 at a back side of the tire. The strap 310 is then fed through the center of the tire, then pulled upwardly at the front of the tire, and finally through the tightening apparatus 320. The tightening apparatus 320 is secured to a second strap that is secured to the tire mount 300 at the front of the tire. The first strap is pulled through the secured tightening apparatus and is pulled downward, activating a ratchet inside of the tightening apparatus, thereby tightening the cargo carrier 100 to the tire. FIG. 9 finally shows that pads or covers of some sort can be used to wrap the tightening apparatus to protect the tire from rubbing, scraping our gouging.

Figure 14:
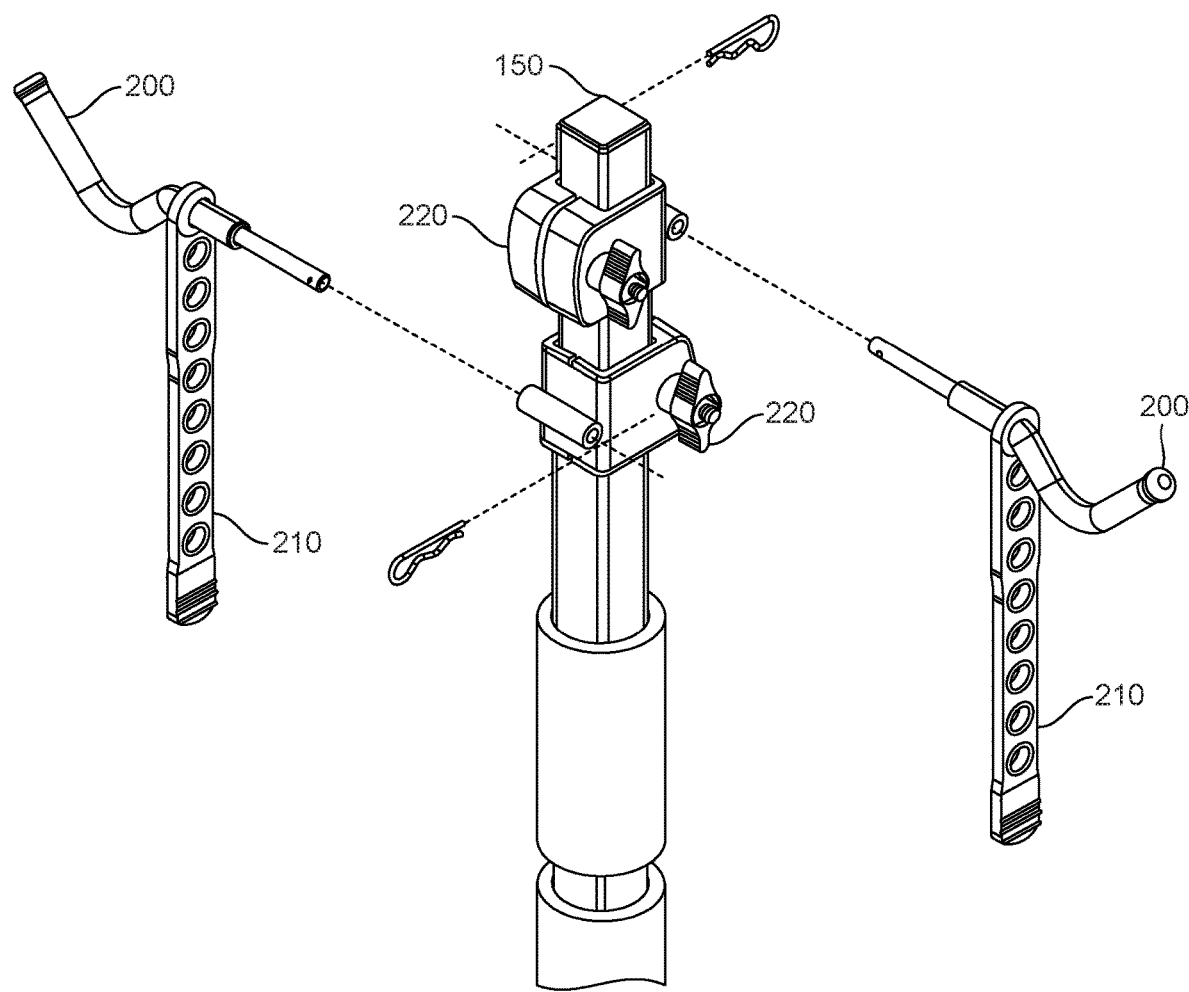
FIG. 14 is a perspective view of the arm top end with payload member straps, payload carrying members and payload carrying member mounts.
Figure 15:
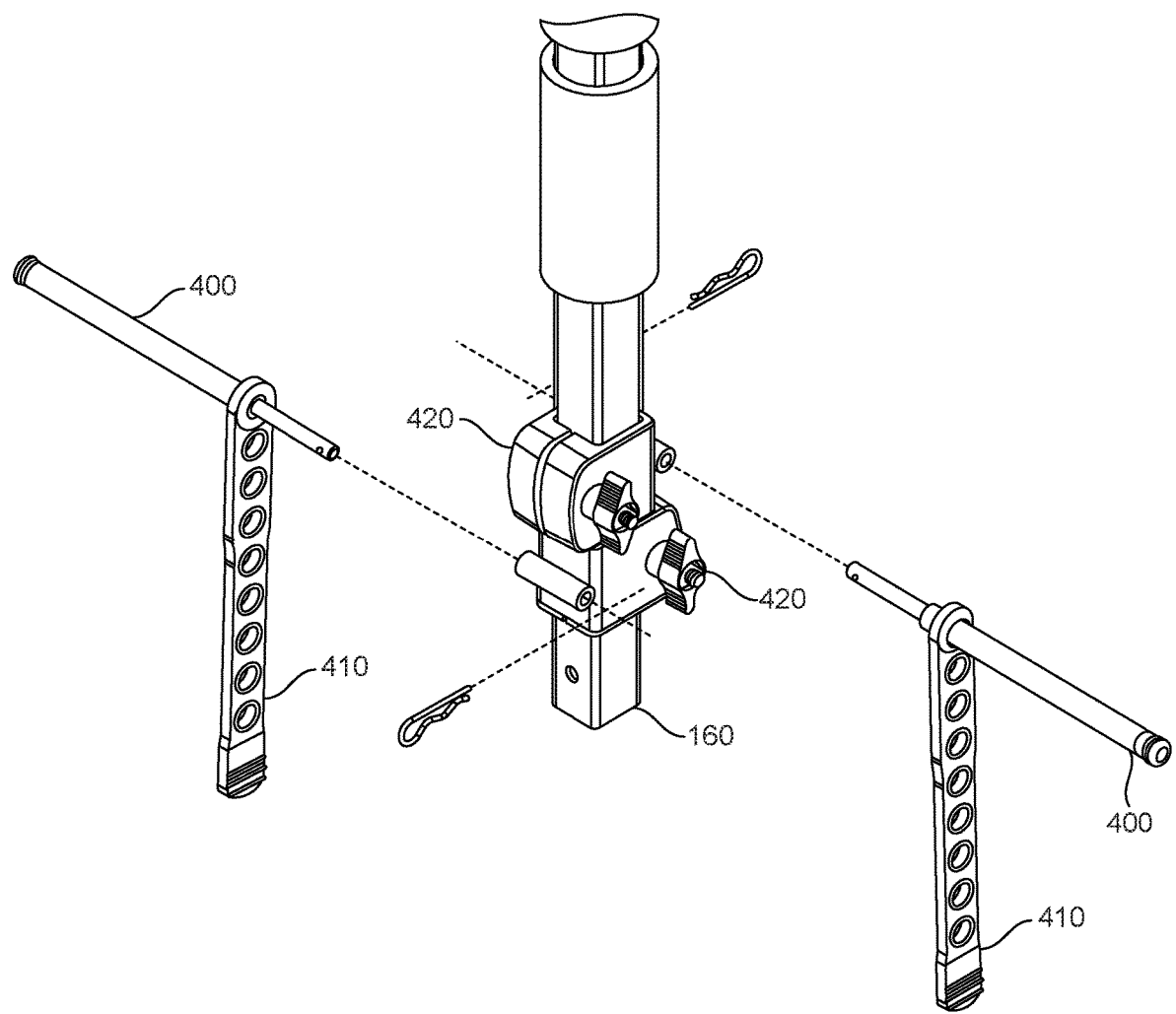
FIG. 15 is a perspective view of the arm bottom end with wheel rest straps, wheel rests and wheel rest mounts.
Figure 16:
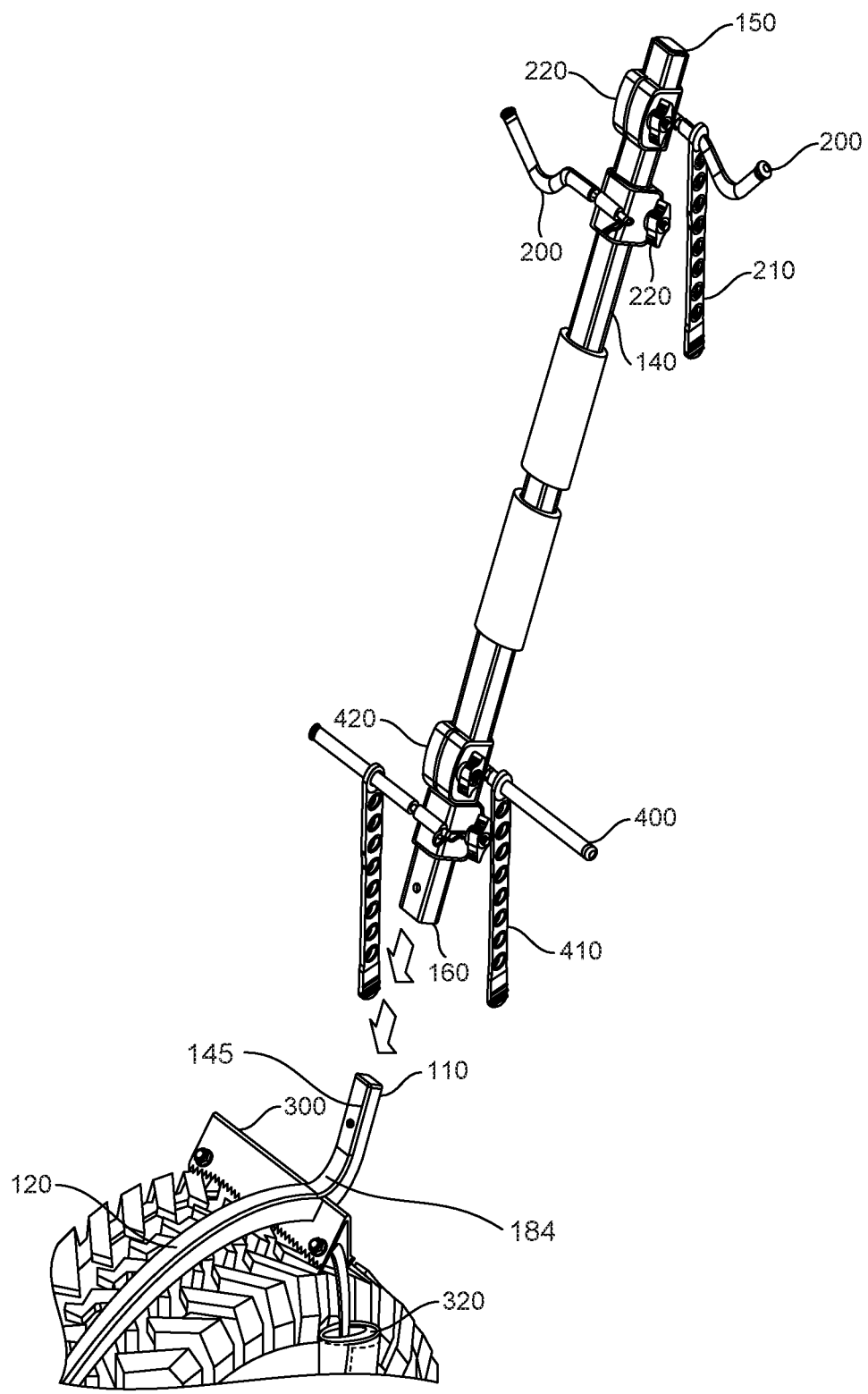
FIG. 16 is a perspective view of the arm with payload member straps, payload carrying members, payload carrying member mounts, wheel rest straps, wheel rests and wheel rest mounts prior to connecting the arm to the bridge end.
Figure 17:
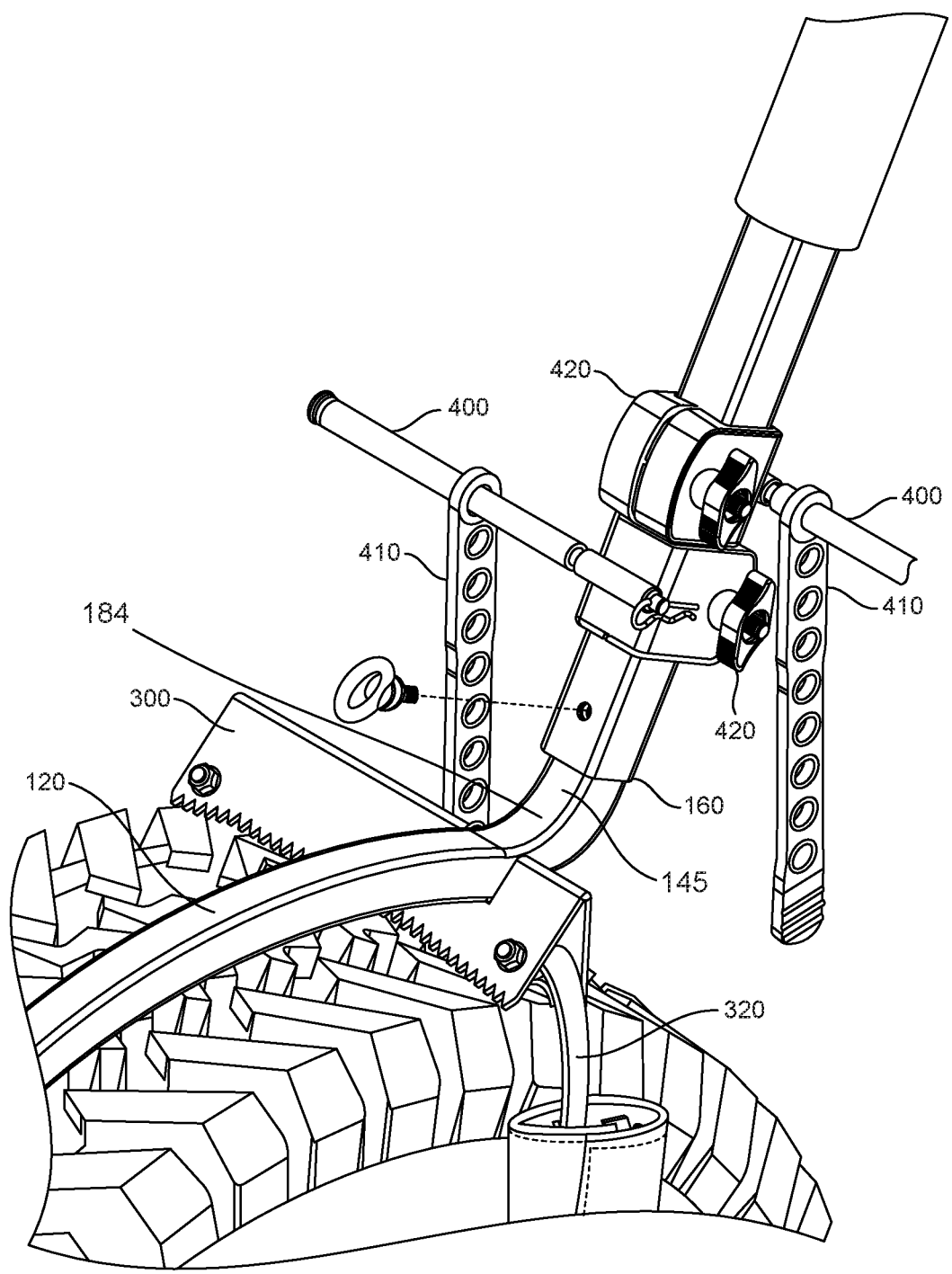
FIG. 17 is a close up perspective view of the arm bottom end with wheel rest straps, wheel rests and wheel rest mounts.

Next we will turn to the arm members and how they are implemented in this invention. FIGS. 10-17 show different views of the arms, how they are connected and what they and their parts do. FIG. 16 shows a perspective view of a single arm member 140 with payload member straps 210, payload carrying members 200, payload carrying member mounts 220, wheel rest straps 410, wheel rests 400 and wheel rest mounts 420 prior to connecting the arm 140 to the bridge end 130. This is the basic configuration for the present invention. Here, the tire mount 300 is seen connected to the tire. Above the tire mount 300 is the bridge second end 130. Next, the arm member 140 is connected to the second end 130. This bridge second end can be permanently connected to the arm 140 either by manufacturing the bridge and arm as one continuous part, the arm 140 can be welded or permanently affixed to the bridge end, or, as is shown in the Figs., the arms 140 can be a separate part that are securedly affixable to the bridge ends 110. 130. FIG. 17 shows one means to connect the separate arm 140 to the bridge end 110. FIG. 17 is a close up perspective view of the arm first end with wheel rest straps 410, wheel rests 400 and wheel rest mounts 420. This FIG. 17 shows a through hole in both the arm and the bridge end through which a pin or other connecting part is inserted and thereafter temporarily fastened. In this way the arms can easily be removed from the cargo carrier. FIG. 16 shows how the arm 140 is connected to the bridge end.

Figure 10:
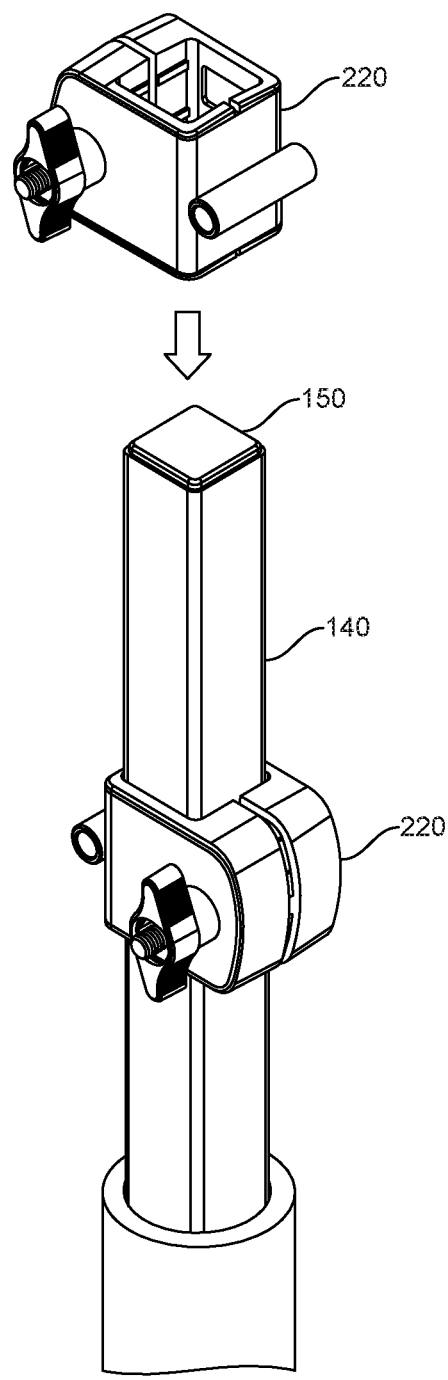
FIG. 10 is a perspective view of an arm top end with payload carrying member mounts.

Next, the arm and its parts will be shown and described. Starting at the arm second end 160, FIG. 10 shows a perspective view of the arm second end with the payload carrying member mounts 220, one already on the arm and the other ready to be installed on the arm. These payload carrying member mounts 220 are used to connect the payload carrying members 200 to the arm 140. These payload carrying member mounts 220 are slideably mounted over the arms 140 and because of this are adjustable along the length of the arm member 140. Also, in the Fig. we can see part of a pad that is used to protect whatever cargo is mounted on the cargo carrier.

Figure 11:
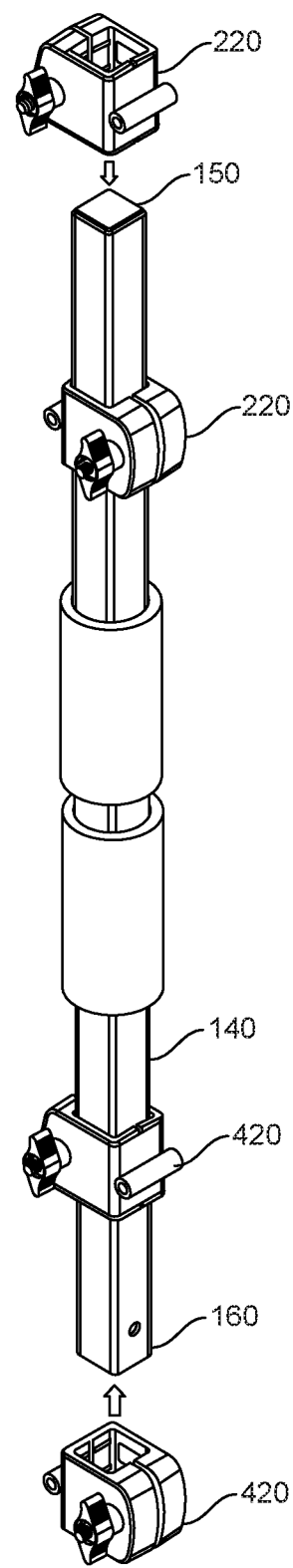
FIG. 11 is a larger perspective view of an arm with payload carrying member mounts.
Figure 12:
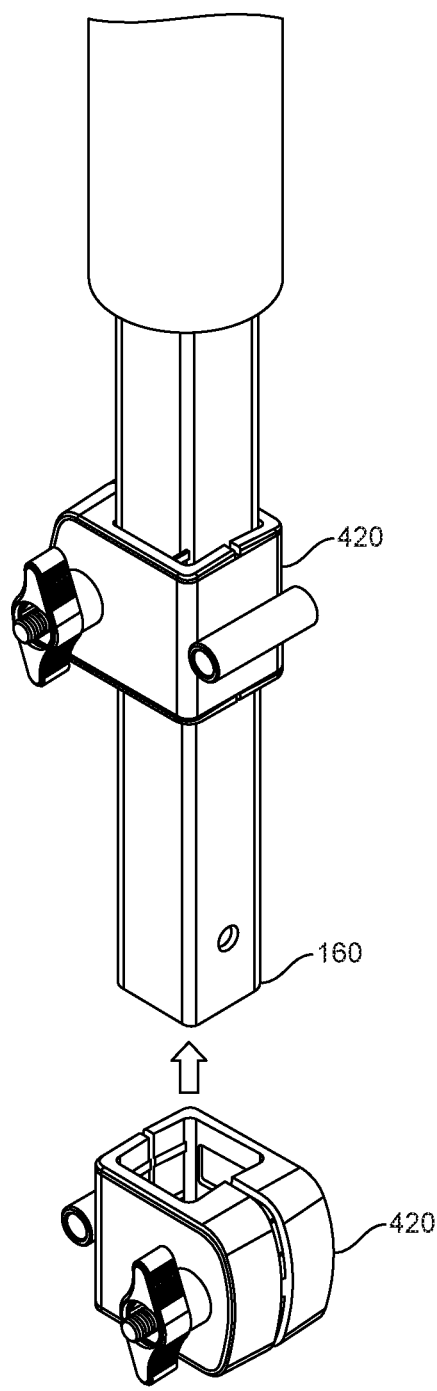
FIG. 12 is a perspective view of an arm bottom end with payload carrying member mounts.

FIG. 11 is a larger perspective view of the arm with two payload carrying member mounts at the second end 160 of the arm and two wheel rest mounts 420 near the arm first end 150. FIG. 12 is a close-up perspective view of the arm first end 150 with the wheel rest mounts 420, one installed and one prior to installation. As can be seen in FIGS. 10-12 the mounts are slid over the arm members, they have a hole or sleeve to secure the mounts, and they have a screw apparatus to tighten and secure the mounts to the arms.

Figure 13:
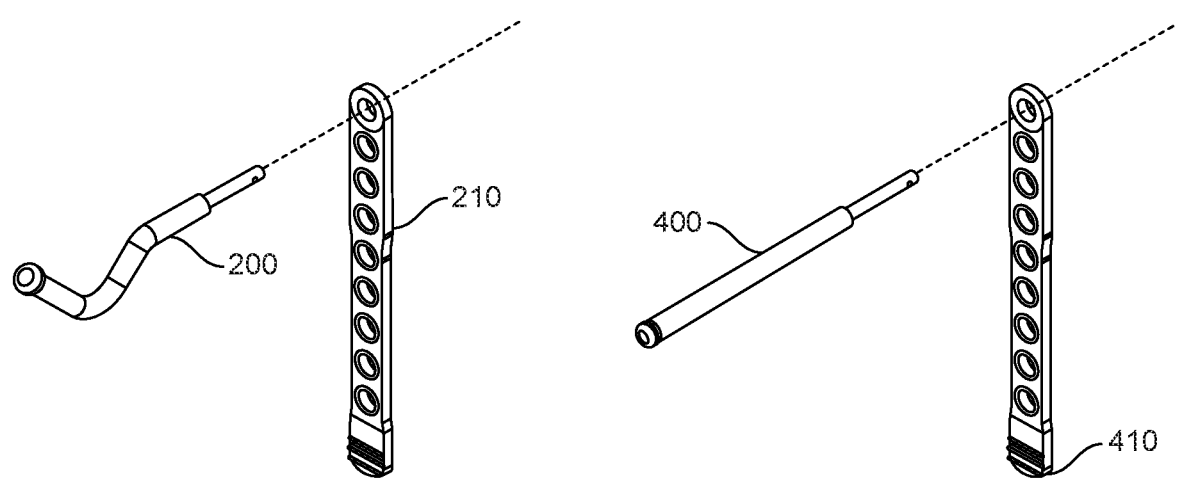
FIG. 13 is a perspective view of the payload member straps and payload carrying members.

Connected to the mounts are the payload carrying members 200 and the wheel rest mounts 420. These are shown in FIGS. 13-15. FIG. 13 is a perspective view of the payload member straps 210 and the payload carrying members 200. FIG. 14 is a perspective view of the arm second end 160 with payload member straps 210, payload carrying members 200 and payload carrying member mounts 220. FIG. 15 finally is a perspective view of the arm first end 150 with wheel rest straps 410, wheel rests 400 and wheel rest mounts 420.

Figure 18:
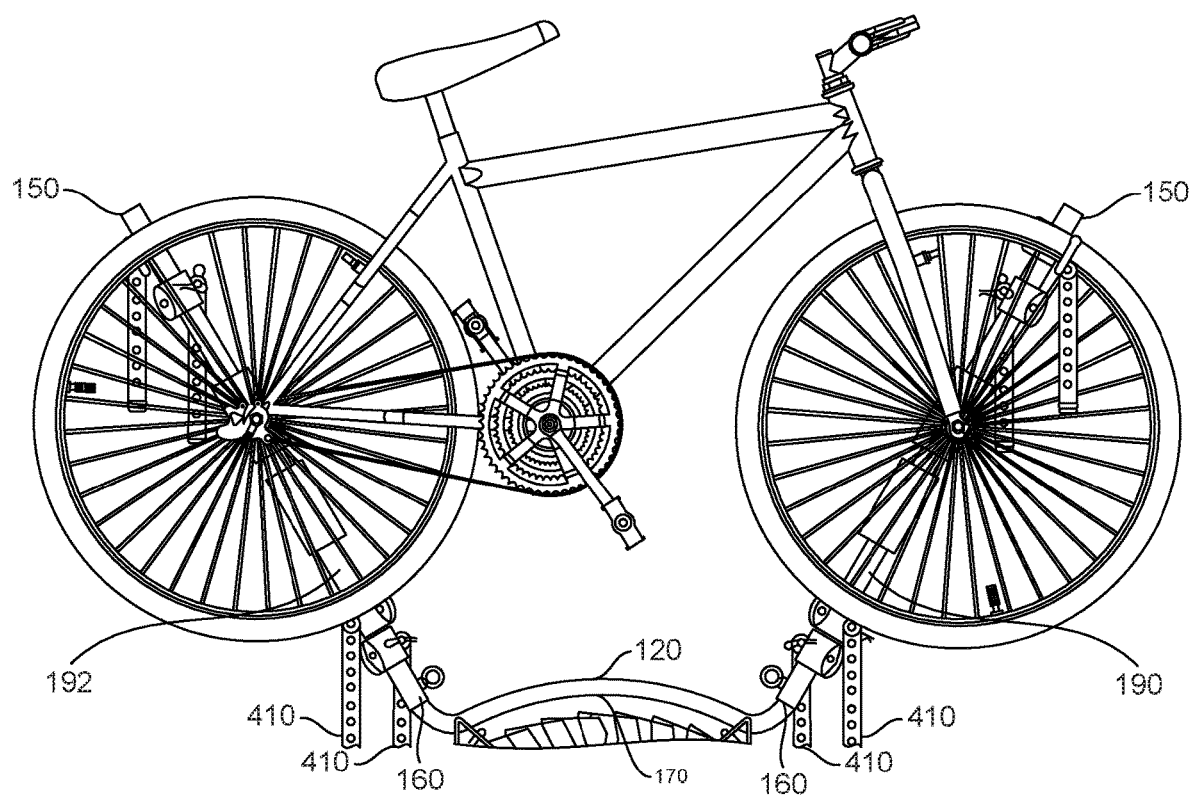
FIG. 18 is a frontal view of the entire cargo carrier with a bicycle hung by its wheels on the front side of the cargo carrier with the straps not secured.

As shown in the Figs and as described above, in this first embodiment the cargo carrier has the arms 140 and the arms 140 have at least one payload carrying member 200 per arm and the arms 140 are constructed so that arm angles and arm lengths are either permanently configured or are manually configurable to hang a bicycle by its wheels using the payload carrying members 200. This configuration is clearly shown in FIG. 18. The cargo carrier in this Fig. has two arms and as can be seen, each arm has one payload carrying member 200 per arm and in this Fig. the cargo carrier is designed to carry a bicycle and the bicycle is hung by its wheels. The carrier is specifically designed to carry the bicycle by its wheels for several reasons. First, it allows the carrier to carry virtually every type of bicycle. Today, bicycles have a wide range of frame configurations, shapes and designs. This large range of frame shapes makes it difficult to carry different bicycles by the frame. On the contrary, the present design hangs the bicycle by the wheels. Wheel sizes and the distance from wheel to wheel on any bicycle is generally the same, or within a short distance of each other. Therefore, it doesn't matter what the frame looks like because the wheel size and distance from one another remains constant.

Figure 19:
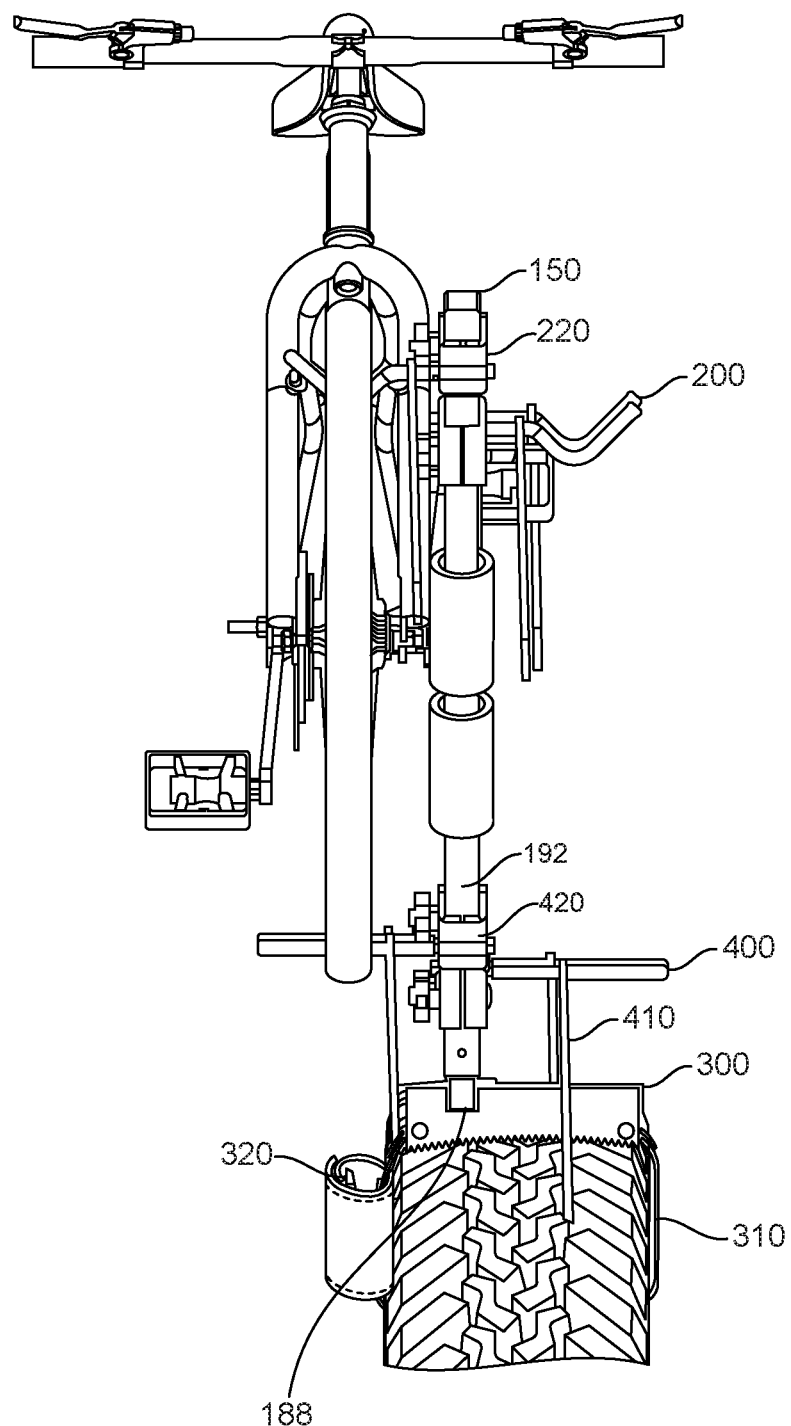
FIG. 19 is a side view of the entire cargo carrier with a bicycle hung by its wheels on the front side of the cargo carrier.
Figure 20:
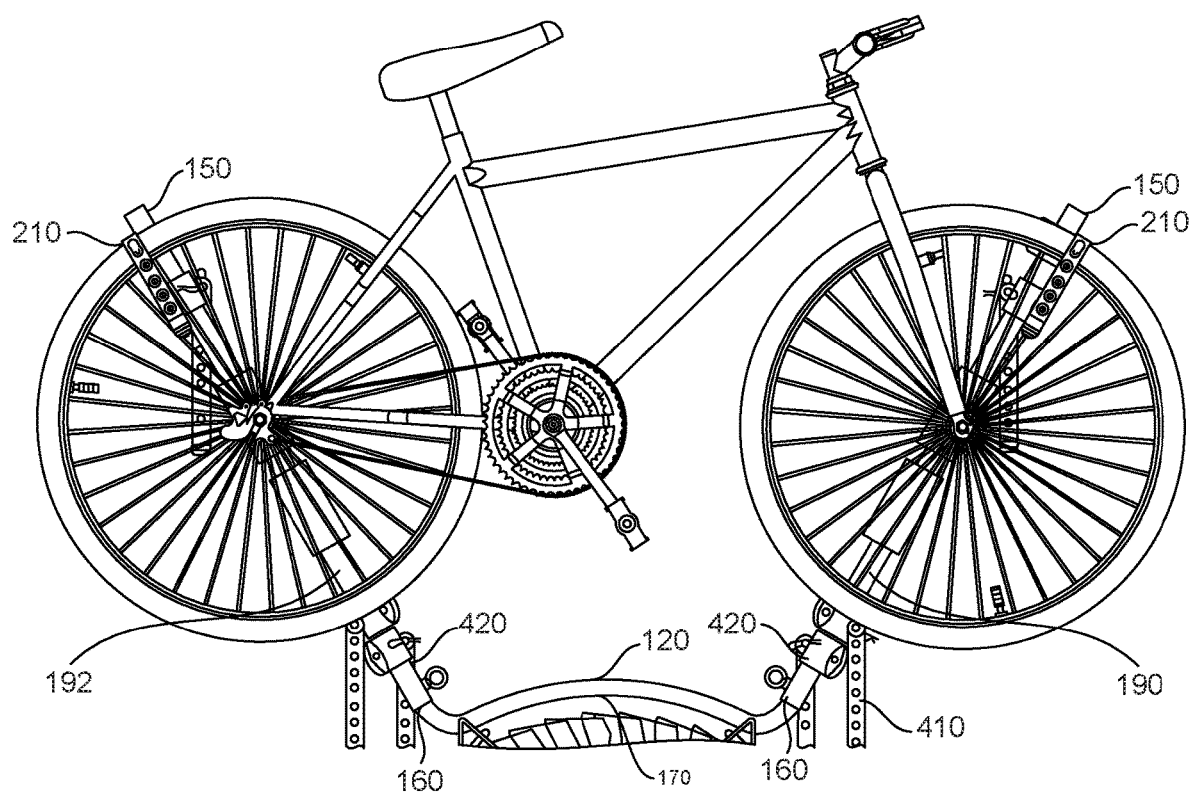
FIG. 20 is a frontal view of the entire cargo carrier with a bicycle hung by its wheels on the front side of the cargo carrier with the straps secured.
Figure 21:
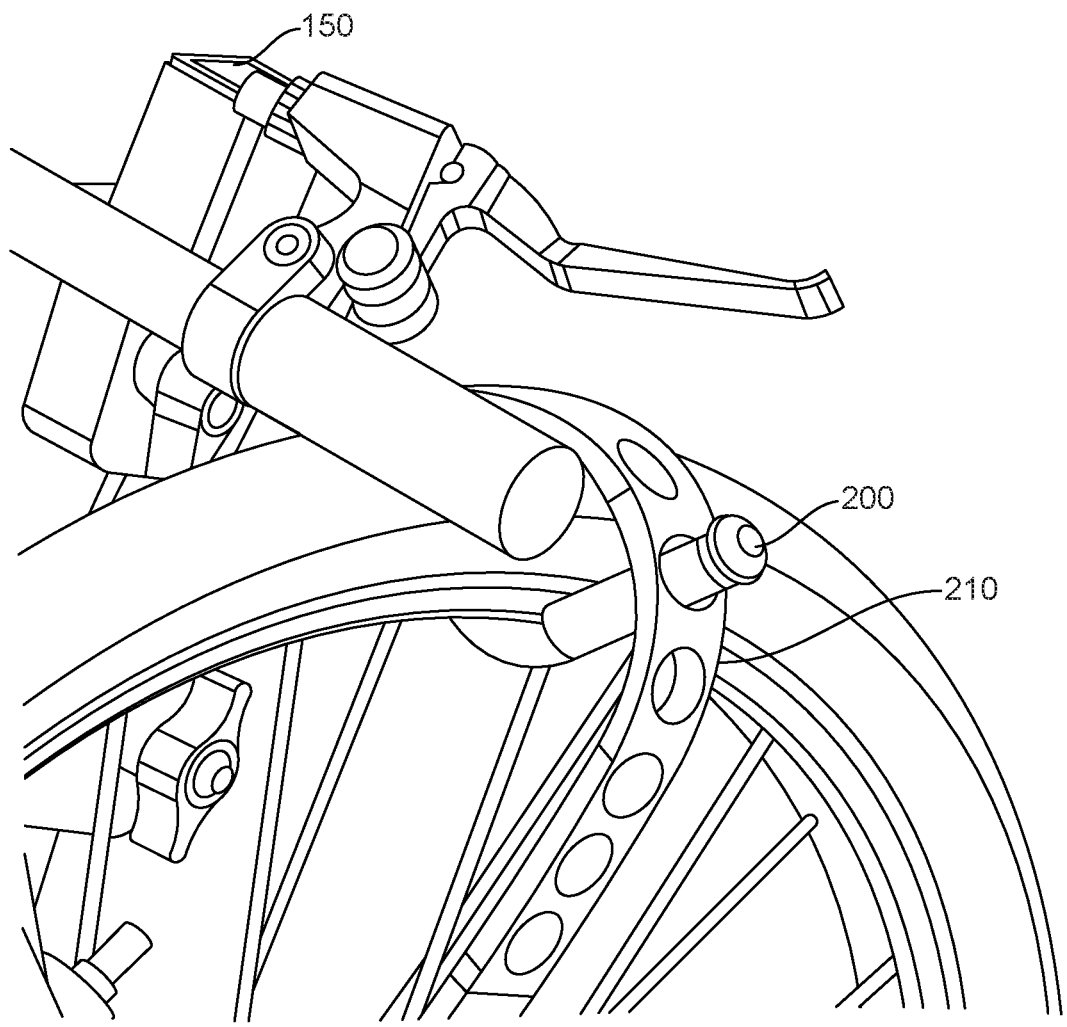
FIG. 21 is a close up perspective frontal view of the upper end of an arm on one side of the cargo carrier with a bicycle hung by its wheels on the front side of the cargo carrier with the payload member strap secured.
Figure 22:
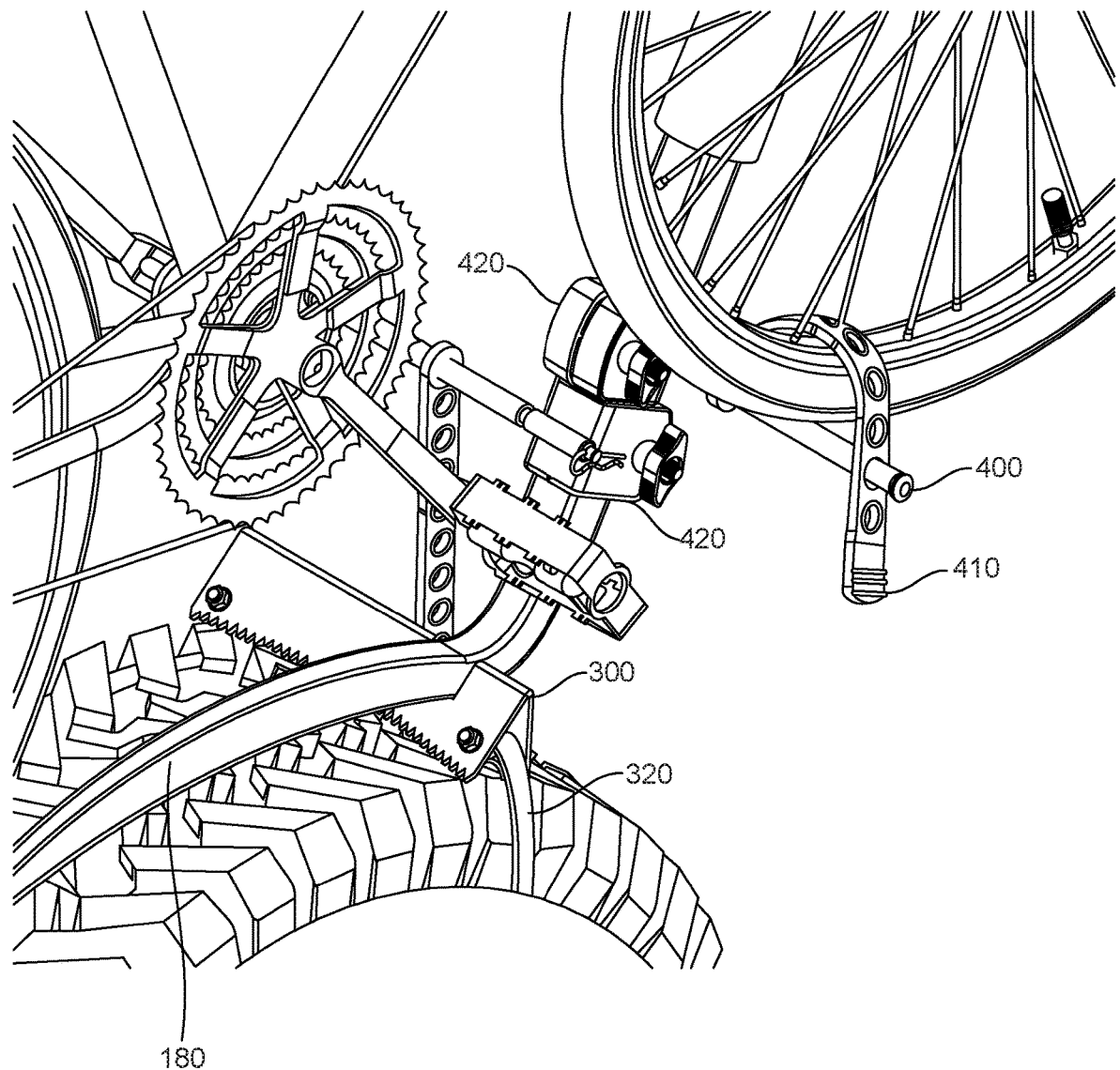
FIG. 22 is a close up perspective frontal view of the lower end of an arm on one side of the cargo carrier with a bicycle hung by its wheels on the front side of the cargo carrier with the wheel rest straps secured.
Figure 23:
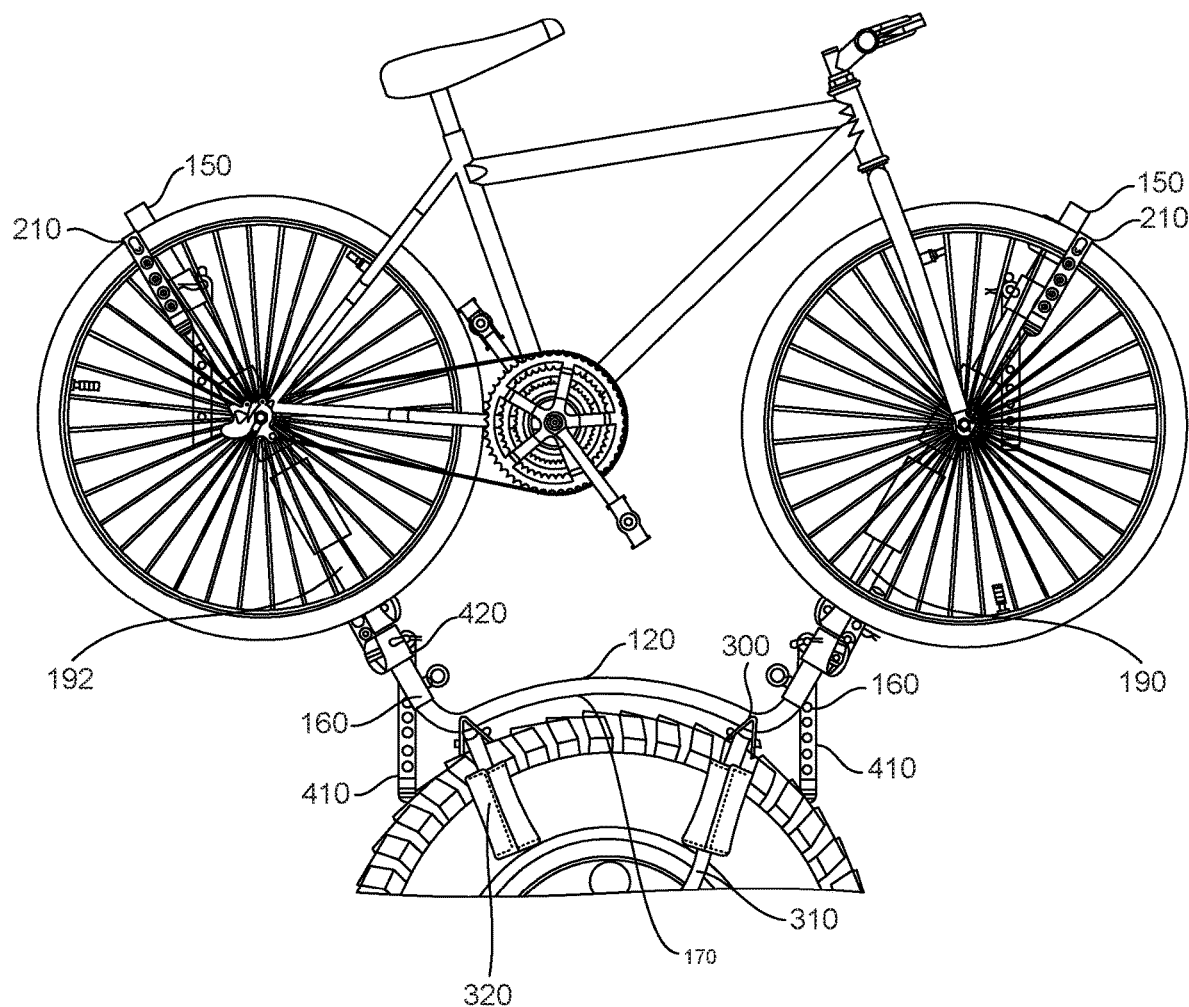
FIG. 23 is a frontal view of the entire cargo carrier with a bicycle hung by its wheels on the front side of the cargo carrier with the payload member straps secured.

In the next FIG. 19 we can see this embodiment from the side and in this Fig. we can see the bicycle hung by its wheels on one side of the cargo carrier. It is also clearly shows the wheel rests located near the wheels. FIG. 20 shows an image similar to FIG. 18 but here the payload member straps 210 are strapped up and over the wheels, holding the bicycle in place and preventing it from bouncing off the cargo carrier. FIG. 21 is a close up of this payload member strap 210 after it is wrapped up and over the wheel and then secured to the outside end of the payload carrying member 200. FIG. 22 shows a similar payload member strap 210 but at the lower end near the tire these straps 210 are used to secure the lower part of the tire to the tire mount 300. At this point the strap is also wrapped around the tire and is then secured to the outside end of the tire mount 300 further preventing the wheel and the bicycle from bouncing and holding it in place. FIG. 23 is yet another image of the bicycle when secured to the front of the cargo carrier.

Figure 24:
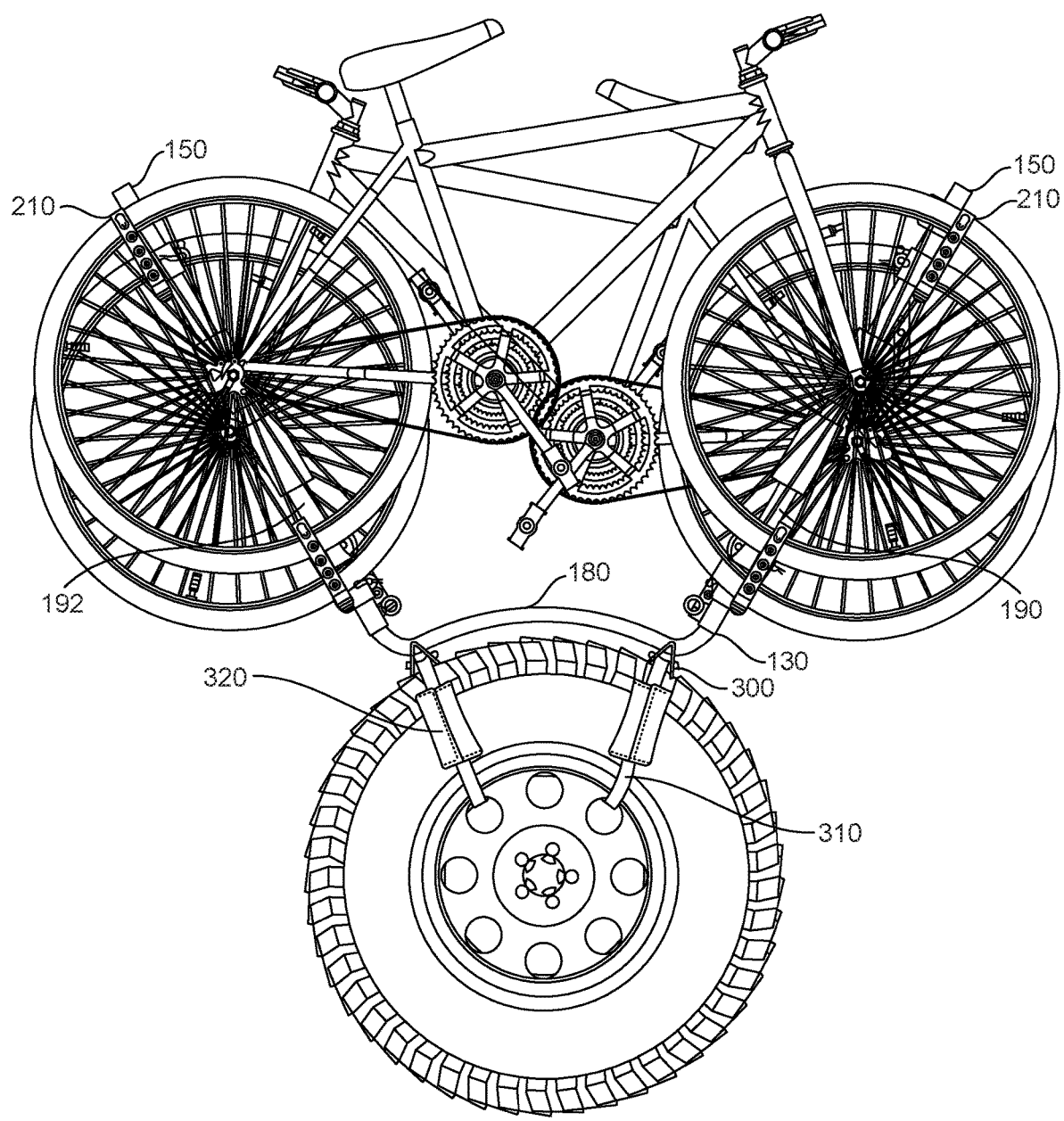
FIG. 24 is a frontal view of the entire cargo carrier with a bicycle hung by its wheels on both sides of the cargo carrier with the payload member straps secured and with the wheel rest straps secured.
Figure 25:
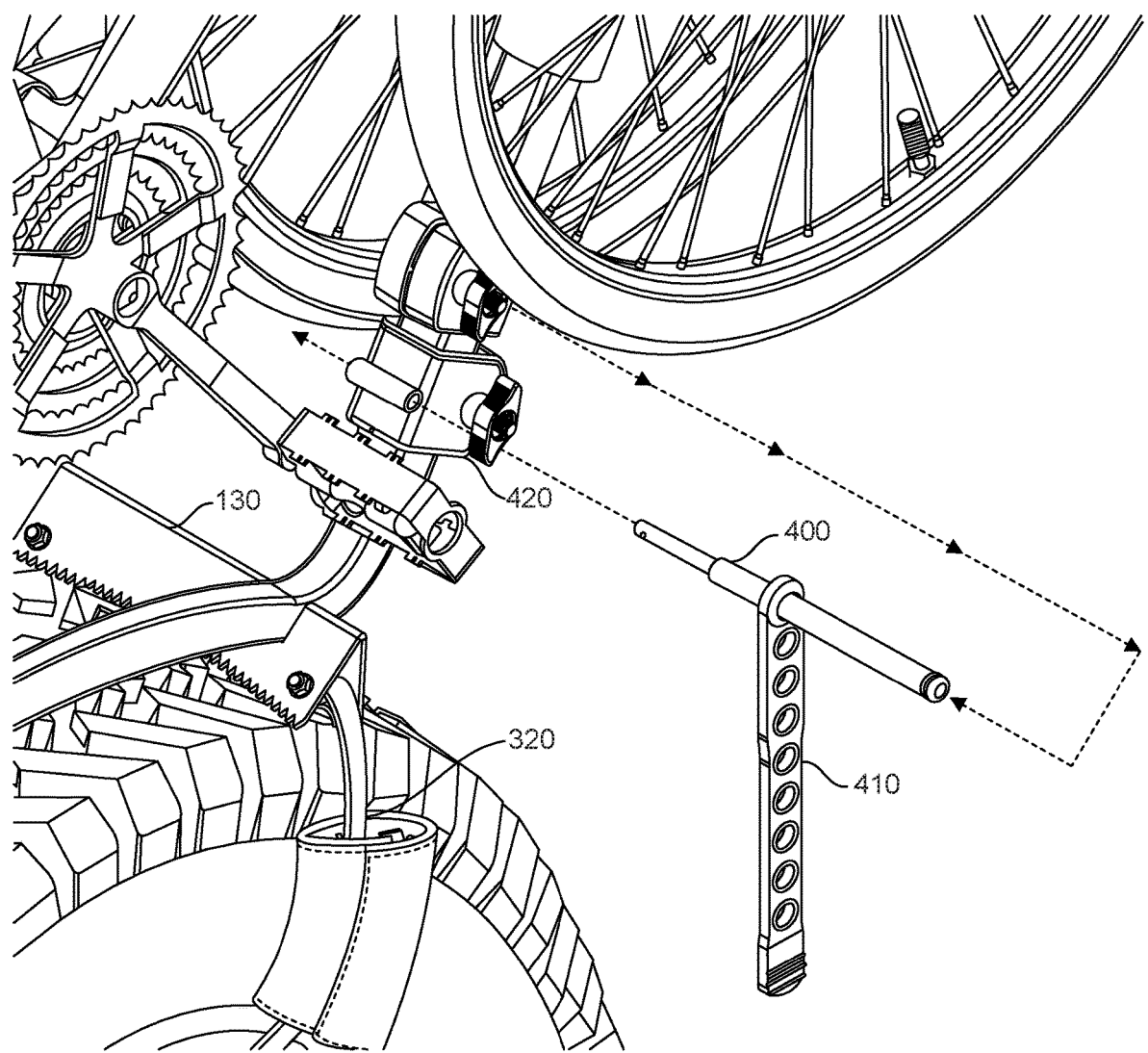
FIG. 25 is a close up perspective frontal view of the lower end of an arm on one side of the cargo carrier with a bicycle hung by its wheels on the front side of the cargo carrier showing the wheel rest straps prior to attachment.

It is also possible to carry cargo such as a bicycle, on both sides of the cargo carrier, as is seen in FIGS. 24 and 25. In this configuration there is the cargo carrier 100 wherein the arms 140 have at least four payload carrying members 200; a first pair of the payload carrying members 200 on a first side of the cargo carrier 140; a second pair of the payload carrying members 200 on a second side of the cargo carrier; and whereby the pairs of payload carrying members 200 can be positioned and configured to each carry a bicycle by its wheels. This is shown in FIG. 24. FIG. 24 also clearly shows the cargo carrier connected to the tire, the arms extending outwardly from the center of the carrier so that they are positioned perfectly to hold bicycles by the wheels. The carrier as shown in FIGS. 24 and 25 is securely connected to the tire and the bicycles are securely hung by their wheels on both sides of the arms. FIG. 25 also more clearly shows in a close up the lower part of the carrier where the wheels rest. In this Fig. the wheel rests 400 are clearly seen, along with the wheel rest mounts 420 and the wheel rest straps 410. It should be understood that the wheel rest straps 410 and the payload member straps 210 as parts are entirely interchangeable one for the other. As can be seen in the Figs., this cargo carrier configuration has at least one wheel rest 400 positioned at or near the arm first end 150 where the bicycle wheel rests against the wheel rest 400 to prevent wheel and bicycle motion, it has a wheel rest strap 410 and a payload member securement strap 210. Also, it is preferred that this configuration have arms that have at least one payload carrying member per arm and has arms that are constructed so that arm angles, arm lengths and payload carrying members are configured to carry a variety of cargos. This allows for the cargo carrier to be configured at different angles and have arms of different lengths. It also allows for the use of different types payload carrying members 200. In the current configuration the members are a hanger or hook. However, they can be any of a variety of members, such as long flat arms, pinchers, grabbers, or whatever else imaginable to secure and hold cargo in place.

It is also possible to have the arm members be removably connectable and securable to the bridge first end and the bridge second ends. As noted, these arms can be a part of the bridge or they could be permanently affixed to the bridge. However, they can also be removeable. For example, the bridge ends could be square tubing (or round or virtually any other shape) and the arm member could be square tubing (or round or virtually any other shape) that is slightly larger in dimension than the bridge end so that the arm member fits over the bridge end. This is shown in FIGS. 16-17. FIG. 17 also shows connecting member that is used to hold the arm member in place. It is also possible to have the arm member 140 as adjustable members. The members themselves can adjust lengthwise such as through the use of push pins or other configurations that allow for lengthening or shortening the arms. In another configuration it is also possible to adjust the distance between the arms. In the present Figs. the arms are all of a fixed distance apart. However, it is possible to have a straight bridge, as in FIG. 27, or curved main bridge and then have arm mounts fastened onto the bridge. These arm mounts can receive the arms into a receiver of some sort and these arm mounts can be slideably moveable along a length of the bridge. Also, the payload carrying members are adjustable in that they are slideably moveable along a length of the arm members. This allows for an even wider range of adjustability because when there are members on each arm, as the payload carrying members are slid upwardly they naturally move farther away from each other, thus creating a larger gap between the payload carrying members. Likewise, the lower payload carrying members can be brought closer to one another by sliding them down the arms towards the bridge.

In another embodiment shown in FIGS. 1-26 there is a cargo carrier 100 for attachment to a mounted tire having a continuous curved bridge and the bridge has a first end 110 followed by a first concave section 182, a convex middle section 180 and a second concave section 185 followed by a second end 130. Next there is an arm member 140 extending upwardly from each of the first 110 and second ends 130 with at least one payload carrying member 200 connectable to the arm members 140 to secure a payload to the cargo carrier 100. There is at least one tire mount 300 connected to a curved bridge bottom 188 that rests on an upper surface of the tire and at least one securement apparatus 310 to secure the cargo carrier 100 to the tire. This embodiment is slightly different from the one previously described in that it features the curved bridge with curved ends. FIG. 1 shows the continuous curved bridge, the tire mounts and the securement apparatus. As can be seen, the bridge in FIG. 1 shows the continuous curved convex bridge middle section 180. On each end of the curved bridge is an upward turn, thus creating each concave section, 182 184. These sections then continue upwards and eventually stop at the bridge first and second ends 110, 130. As can be seen in FIG. 1, this embodiment has two tire mounts 300, one located at the bottom of each of the concave portions of the bridge. To secure these two tire mounts 300 to the tire there are at least two securement apparatus 310 where the first mount 300 is located at the first concave section 182 and the second mount 300 is located at the second concave section 184 and each of the securement apparatus are connectable to the tire mounts and the tire. This is shown in different views, close-ups and different angles in FIGS. 1-9 as follows.

FIG. 2 more clearly defines how the parts are connected. FIG. 2 is a close-up view of one end of the curved bridge showing bridge end 110, the tire mount, the strap connector 330, the strap 310 and an end of the tightening apparatus 320. As can be seen in FIG. 2, the bottom of the tire mount has a jagged edge. This jagged edge helps prevent the cargo carrier from moving on the tire once mounted.

FIG. 3 again is a frontal view of the cargo carrier prior to strap connection.

FIG. 4 is a perspective, close up view similar to FIG. 2 showing one end of the bridge with strap connected. As can be seen the strap uses strap connectors 330 that are removable so that the straps can be removed from the cargo carrier.

FIG. 5 shows the cargo carrier from an entirely different perspective. This Fig. is a side view of the present invention showing the lower part of the cargo carrier connected to the tire mount where the tire mount has perforated slots in the lower base plate for positive engagement with the rubber of a tire to prevent motion or slippage. The tire mount may be secured to the strap with a pin or clamp fitted for braced, seated engagement with standard tire sizes. Although preferred embodiments are configured to fit standard tire sizes, the tire mount may be adjusted to fit alternative tire sizes. In this embodiment the cargo carrier is welded to the tire mount but it should be understood that the carrier 100 can be secured to the tire mount 300 using other connection means. FIG. 5 on the left side also shows the tightening apparatus 320. The cargo carrier 100 is connected using simply the tire mount 300, the strap 310, and the tightening apparatus 320. In practice, as shown in FIGS. 6-9, the straps are connected to the tire mount 300 at a back side of the tire. The strap 310 is then fed through the center of the tire, then pulled upwardly at the front of the tire, and finally through the tightening apparatus 320. The tightening apparatus 320 is secured to a second strap that is secured to the tire mount 300 at the front of the tire. The first strap is pulled through the secured tightening apparatus and is pulled downward, activating a ratchet inside of the tightening apparatus, thereby tightening the cargo carrier 100 to the tire. FIG. 9 finally shows that pads or covers of some sort can be used to wrap the tightening apparatus to protect the tire from rubbing, scraping our gouging.

Next the arm members are described with reference to the figures. In this embodiment with the curved bridge, there is the cargo carrier 100 wherein the arms 140 have at least one payload carrying member 200 per arm and the arms are constructed so that arm angles and arm lengths are either permanently configured or are manually configurable so as to hang a bicycle by its wheels using the payload carrying members 200. As in the previous embodiment, the cargo carrier 100 can have the payload carrying members 200 on the front only, allowing a mount for one bicycle. Alternatively, the cargo carrier can be expanded by having the payload carrying members on the front and back of the arms. In this configuration the arms have at least four payload carrying members 200 that are moveable and adjustable along a length of the arms; a first pair of the payload carrying members 200 are on a first side 190 of the cargo carrier 100; a second pair of said payload carrying members 200 are on a second side 192 of the cargo carrier 100; and the pairs of payload carrying members are positioned and configured to each so as to carry a bicycle by its wheels. Again, this configuration is similar to the first embodiment except for the bridge design. This embodiment featuring the four payload carrying members is shown in FIGS. 16-17 and in FIGS. 24-26. FIG. 24 clearly shows the cargo carrier connected to the tire, the arms extending outwardly from the center of the carrier so that they are positioned perfectly to hold bicycles by the wheels. The carrier as shown in FIGS. 24 and 25 is securely connected to the tire and the bicycles are securely hung by their wheels on both sides of the arms. FIG. 25 also more clearly shows in a close up the lower part of the carrier where the wheels rest. In this Fig. the wheel rests 400 are clearly seen, along with the wheel rest mounts 420 and the wheel rest straps 410. It should be understood that the wheel rest straps 410 and the payload member straps 210 as parts can be entirely interchangeable one for the other but clarity here they have each been designated as separate items. As can be seen in the Figs., this cargo carrier configuration has at least one wheel rest 400 positioned at or near the arm first end 150 where the bicycle wheel rests against the wheel rest 400 to prevent wheel and bicycle motion, it has a wheel rest strap 410 and a payload member securement strap 210. Also, it is preferred that this configuration have arms that have at least one payload carrying member per arm and has arms that are constructed so that arm angles, arm lengths and payload carrying members are configured to carry a variety of cargos. This allows for the cargo carrier to be configured at different angles and have arms of different lengths. It also allows for the use of different types payload carrying members 200. In the current configuration the members are a hanger or hook. However, they can be any of a variety of members, such as long flat arms, pinchers, grabbers, or whatever else imaginable to secure and hold cargo in place.

It is also possible to have the arm members be removably connectable and securable to the bridge first end and the bridge second ends. As noted, these arms can be a part of the bridge or they could be permanently affixed to the bridge. However, they can also be removeable. For example, the bridge ends could be square tubing (or round or virtually any other shape) and the arm member could be square tubing (or round or virtually any other shape) that is slightly larger in dimension than the bridge end so that the arm member fits over the bridge end. This is shown in FIGS. 16-17. FIG. 17 also shows connecting member that is used to hold the arm member in place. It is also possible to have the arm member 140 as adjustable members. The members themselves can adjust lengthwise such as through the use of push pins or other configurations that allow for lengthening or shortening the arms. In another configuration it is also possible to adjust the distance between the arms. In the present Figs. the arms are all of a fixed distance apart. However, it is possible to have a straight bridge as in FIG. 27 or curved main bridge as described above and then have arm mounts or receivers that fastened onto the bridge. These arm mounts or receivers can receive the arms into the receiver of some sort and these arm mounts can be slideably moveable along a length of the bridge. Also, the payload carrying members are adjustable in that they are slideably moveable along a length of the arm members. This allows for an even wider range of adjustability because when there are members on each arm, as the payload carrying members are slid upwardly they naturally move farther away from each other, thus creating a larger gap between the payload carrying members. Likewise, the lower payload carrying members can be brought closer to one another by sliding them down the arms towards the bridge thus decreasing the distance between the mounts.

Arm members may be sized to telescope out tubular sections to extension points commensurate to the respective cargo. This allows not only adjustment of the carrier for differing heights but also differing lengths since the arm members are adjusting at an angle.

Potential configurations which may be employed to accommodate various vehicle spare tire sizes and locations, and cargo types are too numerous and diverse to specify in detail herein. Variously configured and bulky items, such as, for example, bicycles, cargo boxes or awnings, lights, or even wheelchairs, may be attached by use of appropriate commercially available fasteners, such as, for example, bungee cords, pins and clamps, onto arms secured within the mounting members of the Y receiver above the spare tire. As can be readily discerned, such fasteners could be readily adapted to attach equipment and cargo of various sizes. For example, the receiver may be adapted to transport skis and snowboards of successively shorter lengths by fastening them across the horizontal axis of the cargo carrier in order of descending lengths from the upper edge to the mounting bracket, the bottom of which could cradle a boot bag with boots secured onto the base plate. Similarly, water sports equipment and gear, such as water skis, surfboards, and wake boards of successively descending lengths, could be aligned and fastened along the arm members mounted on the receiver.

As used herein, "vehicle" refers to cars, trucks, sport utility vehicles, Jeeps®, ATVs, trailers and any other vehicle accessory or transport container of suitable size and purpose that has an externally mounted spare tire. "A corresponding surface on a vehicle," as used herein, refers not only to a direct surface of the "spare tire" defined above—it is a yet further aspect of the present invention comprises positioning the receiver mount on a mounting frame comprised of a frame member of bent tubing connected at perpendicular corner plates to form a fixture for securely attaching to a spare tire to housing equipment or cargo therein top or to either side of the spare tire.

The present invention also provides a modular configuration alternatively attachable to a spare tire or as a garage or campsite storage rack when off the vehicle. Embodiments attachable to the receivers employ attachment media configured for modular engagement with the spare tire and cargo to be carried.

The present invention provides a modular configuration attachable to a spare tire or storage area. The inner tube of the mounting member is ideally 1 in.×1 in. (2.54 cm×2.54 cm) square metal tubing and the outer Wing tube ideally are 25 in.×1.25 in. (31.8 mm×31.8 mm) tube. The square tube sizes of the latter described preferred embodiment correspond to conventional securing media and provide for removeable arms for compact use or to provide clearance for parking garages.

As illustrated in the drawings and described in detail herein, various preferred embodiments of the present invention deploy mounting members angled outwardly from a mounting plate connected to a spare tire mount employing flanges of a bracket securable in braced engagement to the tire. Such versatile adaptability and portability of the mounting members according to the present invention thus imparts significant features and advantages thereof.

Preferred embodiments of the present invention may further include holes, notches, pockets or protrusions on the receiver for receiving and securing cargo.

Another aspect of the present invention is provided by alternative embodiments employing various types of fasteners adaptable to differing recreational equipment, tools and other cargo. Such fasteners and supports include, without limitation, cradles for wheels or other suitably shaped structures, hooks, bungees, clamps, clips, clasps and elastomer cords. Fasteners and supports are pinned, looped, clamped or otherwise secured on the cargo carrier to accommodate differing sizes and shapes of recreational equipment, tools and cargo cases. Adjustment of fasteners and supports along the angular orientation of arm members facilitate versatile adaptation accommodation to differing types, sizes and shapes of cargo.

Features and embodiments of the present invention are numerous and diverse, extending beyond the detailed description and claims herein. For example, the receiver and its mounting members, as well as, tubular arms of the present invention can be attached to other surfaces, items and containers not specified herein.

Another feature of a preferred embodiment of the present invention enables adjustment of the height of the arm members and adapting fasteners to enable the cargo on rear of vehicle applications to be mounted well away from the heat of the vehicle tailpipe emission.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by letters patent includes the following.

What I claim:

1. A cargo carrier for attachment to a vertically mounted tire comprising:
    a bridge having a first end, a middle section and a second end;
    arm members, each having a first end located near and extending upwardly from said bridge first end and said bridge second end;
    at least one payload carrying member connectable to said arm members to secure a payload to said cargo carrier;
    at least one tire mount at a bridge bottom that rests on an upper surface of said tire; and
    at least one securement apparatus for securing said cargo carrier to said tire.

2. The cargo carrier of claim 1 wherein said securement apparatus comprises:
    a strap; and
    a tightening apparatus; whereby
        said tightening apparatus is connected to each strap to tighten said strap between said tire mount and said tire to securely tighten and hold said cargo carrier to said tire.

3. The cargo carrier of claim 2 further comprising:
    at least two tire mounts wherein said first tire mount is located at said bridge first end and said second tire mount is located at said bridge second end;
    at least two straps wherein a first strap is connectable to said first tire mount and a second strap is connectable to said second tire mount.

4. The cargo carrier of claim 3 wherein:
    said arms have at least one payload carrying member per arm; and
    said arms are constructed so that arm angles and arm lengths are either permanently configured or are manually configurable to hang a bicycle by its wheels using said payload carrying members.

5. The cargo carrier of claim 4 wherein:
    said arms have at least four payload carrying members;
        a first pair of said payload carrying members on a first side of said cargo carrier;
        a second pair of said payload carrying members on a second side of said cargo carrier; and
        whereby said pairs of payload carrying members can be positioned and configured to each carry a bicycle by its wheels.

6. The cargo carrier of claim 5 further comprising:
    at least one wheel rest positioned at or near said arm first end where said bicycle wheel rests against said wheel rest to prevent wheel and bicycle motion;
    a wheel rest strap; and
    a payload member securement strap.

7. The cargo carrier of claim 3 wherein:
said arms have at least one payload carrying member per arm; and
said arms are constructed so that arm angles, arm lengths and payload carrying members are configured to carry a variety of cargos.

8. The cargo carrier of claim 7 wherein said arm members are removably connectable and securable at bridge said first end and said second ends.

9. The cargo carrier of claim 8 wherein:
said arms are adjustable lengthwise and widthwise; and
said payload carrying members are slideably adjustable along a length of said arms.

10. A cargo carrier for attachment to a tire comprising:
a curved bridge comprising:
  a first end followed by a first concave section;
  a convex middle section; and
  a second concave section followed by a second end;
an arm member extending upwardly from each of said first and second ends;
at least one payload carrying member connectable to said arm members to secure a payload to said arms;
at least one tire mount at a curved bridge bottom whereby said tire mount rests on an upper surface of said tire; and
at least one securement apparatus to secure said cargo carrier to said tire.

11. The cargo carrier of claim 10 wherein:
said at least one tire mount is at least two tire mounts;
said at least one securement apparatus is at least two securement apparatus;
said first mount is located at said first concave section;
said second mount is located at said second concave section; and
each of said securement apparatus are connectable to said tire mounts and said tire.

12. The cargo carrier of claim 11 wherein said securement apparatus is a strap with a tightening apparatus to tighten said strap and to securely tighten and hold said cargo carrier to said tire.

13. The cargo carrier of claim 12 wherein:
said arms have at least one payload carrying member per arm; and
said arms are constructed so that arm angles and arm lengths are either permanently configured or are manually configurable so as to hang a bicycle by its wheels using said payload carrying members.

14. The cargo carrier of claim 13 wherein:
said arms have at least four payload carrying members that are moveable and adjustable along a length of said arms;
a first pair of said payload carrying members are on a first side of said cargo carrier;
a second pair of said payload carrying members are on a second side of said cargo carrier; and
said pairs of payload carrying members are positioned and configured to each so as to carry a bicycle by its wheels.

15. The cargo carrier of claim 14 further comprising:
a pair of wheel rest positioned at or near said arms first ends; whereby
said bicycle wheels rest against said wheel rests to prevent wheel and bicycle motion.

16. The cargo carrier of claim 12 wherein:
said arms have at least one payload carrying member per arm; and
said arms are constructed so that arm angles, arm lengths and payload carrying members are either permanently configured or are manually configurable to carry a variety of cargo.

17. The cargo carrier of claim 16 wherein said arm members are removably connectable and securable to each of said bridge first and second ends.

18. The cargo carrier of claim 17 wherein:
said bridge is slideably adjustable to decrease or increase the space between said arm members in order to adjust a width between said arms; and
said payload carrying members are slideably connected to said arms.

* * * * *